(12) United States Patent
Davidson et al.

(10) Patent No.: US 10,101,122 B2
(45) Date of Patent: Oct. 16, 2018

(54) RIFLE SCOPE ELEVATION TURRET MECHANISM

(71) Applicant: REVIC, LLC, Burlington, WY (US)

(72) Inventors: Aaron Skip Davidson, Cody, WY (US); Christopher Ryan Thomas, Cody, WY (US); Andreas Gerhard Schaefer, Hohenahr (DE)

(73) Assignee: REVIC, LLC, Burlington, WY (US)

(*) Notice: Subject to any disclaimer, the term of this patent is extended or adjusted under 35 U.S.C. 154(b) by 248 days.

(21) Appl. No.: 14/820,080

(22) Filed: Aug. 6, 2015

(65) Prior Publication Data

US 2016/0040959 A1   Feb. 11, 2016

Related U.S. Application Data

(60) Provisional application No. 62/035,105, filed on Aug. 8, 2014.

(51) Int. Cl.
   *F41G 1/38*   (2006.01)
   *G02B 27/32*   (2006.01)

(52) U.S. Cl.
   CPC .............. *F41G 1/38* (2013.01); *G02B 27/32* (2013.01)

(58) Field of Classification Search
   CPC .................................. F41G 1/38; G02B 27/32
   USPC ............................................................ 42/122
   See application file for complete search history.

(56) References Cited

U.S. PATENT DOCUMENTS

| 3,297,389 | A | * | 1/1967 | Gibson | G02B 23/14 359/424 |
|---|---|---|---|---|---|
| 4,408,842 | A | * | 10/1983 | Gibson | G02B 23/145 359/422 |
| 6,005,711 | A | * | 12/1999 | Mai | G02B 7/10 359/399 |
| 6,351,907 | B1 | * | 3/2002 | Otteman | F41G 1/38 42/120 |
| 6,643,970 | B2 | * | 11/2003 | Huber | F41G 1/38 42/119 |
| 6,721,095 | B2 | * | 4/2004 | Huber | G02B 27/34 359/425 |
| 7,578,091 | B2 | * | 8/2009 | Klepp | F41G 1/38 42/111 |

(Continued)

OTHER PUBLICATIONS

International Search Report dated Nov. 19, 2015 as received in Application No. PCT/US2015/044028.

(Continued)

*Primary Examiner* — Michelle Clement
(74) *Attorney, Agent, or Firm* — Dorsey & Whitney LLP

(57) ABSTRACT

A scope turret including a dial assembly that is configured to adjust point of aim optics of a scope is disclosed. The turret may include an adjustable stop assembly that prevents the dial assembly from rotating in one direction. The adjustable stop assembly may include a traveler, a nut assembly, and a bolt. The adjustable stop assembly may be internally-adjustable or externally-adjustable. The dial assembly may include an engagement mechanism. The engagement mechanism may include a button that is slidable between an engaged position and a disengaged position of the engagement mechanism. The turret may further include a locking mechanism that selectively prevents the dial assembly from rotating in any direction.

10 Claims, 26 Drawing Sheets

(56) References Cited

U.S. PATENT DOCUMENTS

| | | | | |
|---|---|---|---|---|
| 7,581,346 B2* | 9/2009 | Klepp | F41G 1/38 | 42/111 |
| 7,612,952 B2* | 11/2009 | Schafer | F41G 1/18 | 356/247 |
| 7,640,830 B2* | 1/2010 | Bonis | F41G 1/38 | 42/119 |
| 7,706,065 B2* | 4/2010 | Regan | G02B 7/04 | 359/399 |
| 7,937,879 B2* | 5/2011 | Hamilton | F41G 1/38 | 42/111 |
| 7,997,163 B2* | 8/2011 | Casas | F41G 1/44 | 359/424 |
| 8,006,429 B2* | 8/2011 | Windauer | F41G 1/38 | 42/119 |
| 8,166,696 B2* | 5/2012 | Hamilton | F41G 1/38 | 359/429 |
| 8,270,104 B2* | 9/2012 | Windauer | F41G 1/18 | 359/381 |
| 8,312,667 B2* | 11/2012 | Thomas | F41G 1/18 | 42/119 |
| 8,397,420 B2* | 3/2013 | Hamilton | F41G 1/38 | 359/429 |
| 8,413,364 B2* | 4/2013 | Riley | G02B 7/004 | 42/122 |
| 8,490,317 B2* | 7/2013 | Adkins | F41G 1/38 | 42/135 |
| 8,919,026 B2* | 12/2014 | Hamilton | F41G 1/38 | 356/247 |
| 8,984,796 B2* | 3/2015 | Thomas | F41G 1/28 | 42/119 |
| 9,062,934 B1* | 6/2015 | Presley | F41G 1/38 | |
| 9,182,773 B2* | 11/2015 | Campean | G05G 1/082 | |
| 9,297,615 B2* | 3/2016 | Meinert | F41G 1/387 | |
| RE46,011 E* | 5/2016 | Huber | F41G 1/38 | |
| 9,354,438 B2* | 5/2016 | Ingenito | F41G 1/38 | |
| 9,658,032 B2* | 5/2017 | Porter | F41G 1/38 | |
| 9,677,848 B2* | 6/2017 | Hamilton | F41G 1/38 | |
| 2003/0140545 A1* | 7/2003 | Huber | F41G 1/38 | 42/122 |
| 2007/0137089 A1* | 6/2007 | William, III | F41G 1/38 | 42/122 |
| 2007/0240356 A1* | 10/2007 | Klepp | F41G 1/38 | 42/122 |
| 2008/0066364 A1* | 3/2008 | Klepp | F41G 1/38 | 42/122 |
| 2008/0236018 A1* | 10/2008 | Halverson | F41G 1/16 | 42/135 |
| 2009/0044660 A1* | 2/2009 | Bonis | F41G 1/38 | 74/813 L |
| 2009/0199452 A1* | 8/2009 | Huber | F41G 1/38 | 42/125 |
| 2010/0175298 A1* | 7/2010 | Thomas | F41G 1/18 | 42/122 |
| 2011/0061285 A1* | 3/2011 | Hamilton | F41G 1/38 | 42/122 |
| 2011/0100152 A1 | 5/2011 | Huynh | | |
| 2011/0102918 A1* | 5/2011 | Windauer | F41G 1/18 | 359/821 |
| 2011/0242650 A1* | 10/2011 | Windauer | F41G 1/44 | 359/428 |
| 2012/0167444 A1 | 7/2012 | Adkins et al. | | |
| 2013/0276345 A1* | 10/2013 | Hamilton | F41G 1/38 | 42/119 |
| 2014/0137458 A1 | 5/2014 | Crispin | | |
| 2014/0196351 A1* | 7/2014 | Campean | G05G 1/082 | 42/119 |
| 2015/0268001 A1* | 9/2015 | Porter | F41G 1/38 | 42/130 |
| 2017/0328674 A1* | 11/2017 | VanBecelaere | F41G 1/38 | |
| 2017/0363388 A9* | 12/2017 | Hamilton | F41G 1/38 | |

OTHER PUBLICATIONS

Written Opinion of the International Searching Authority dated Nov. 19, 2015 as received in Application No. PCT/US2015/044028.

* cited by examiner

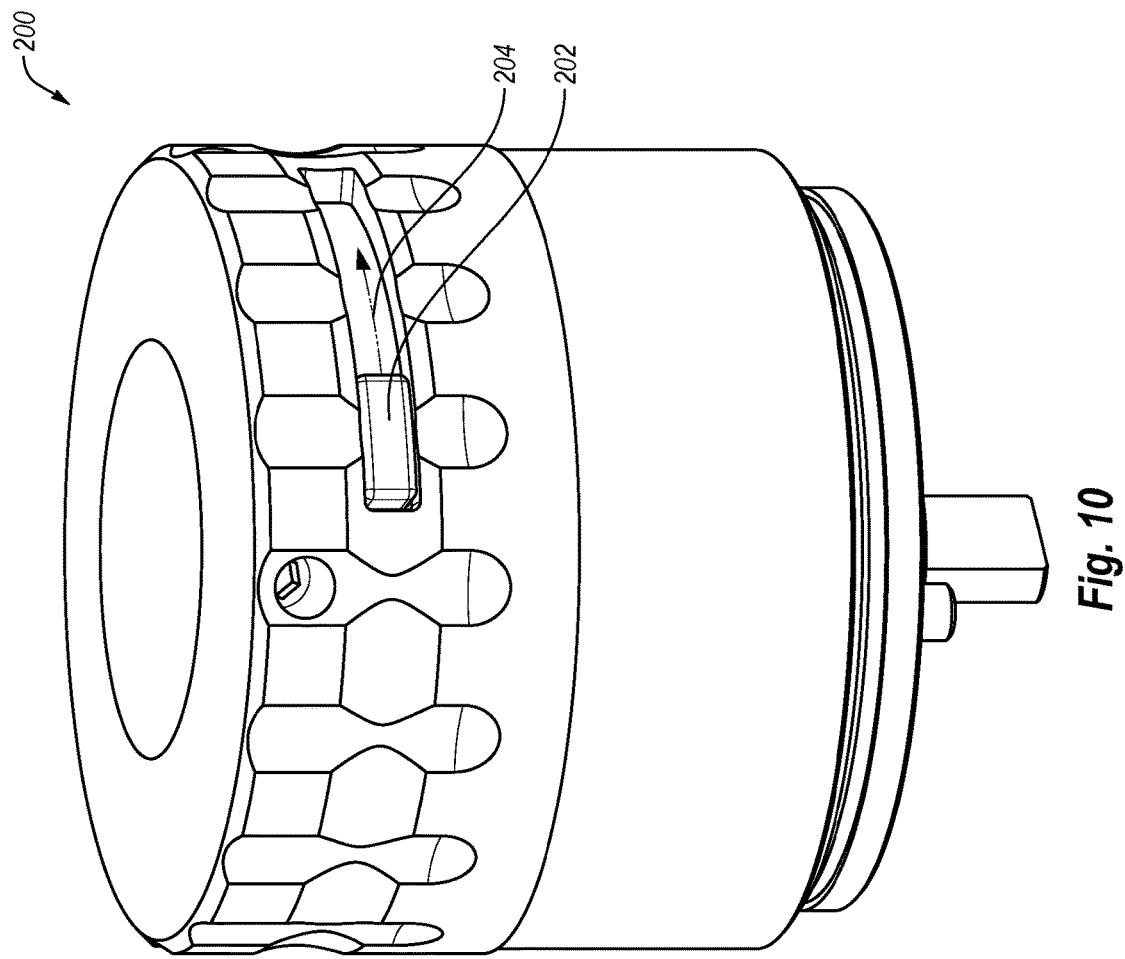

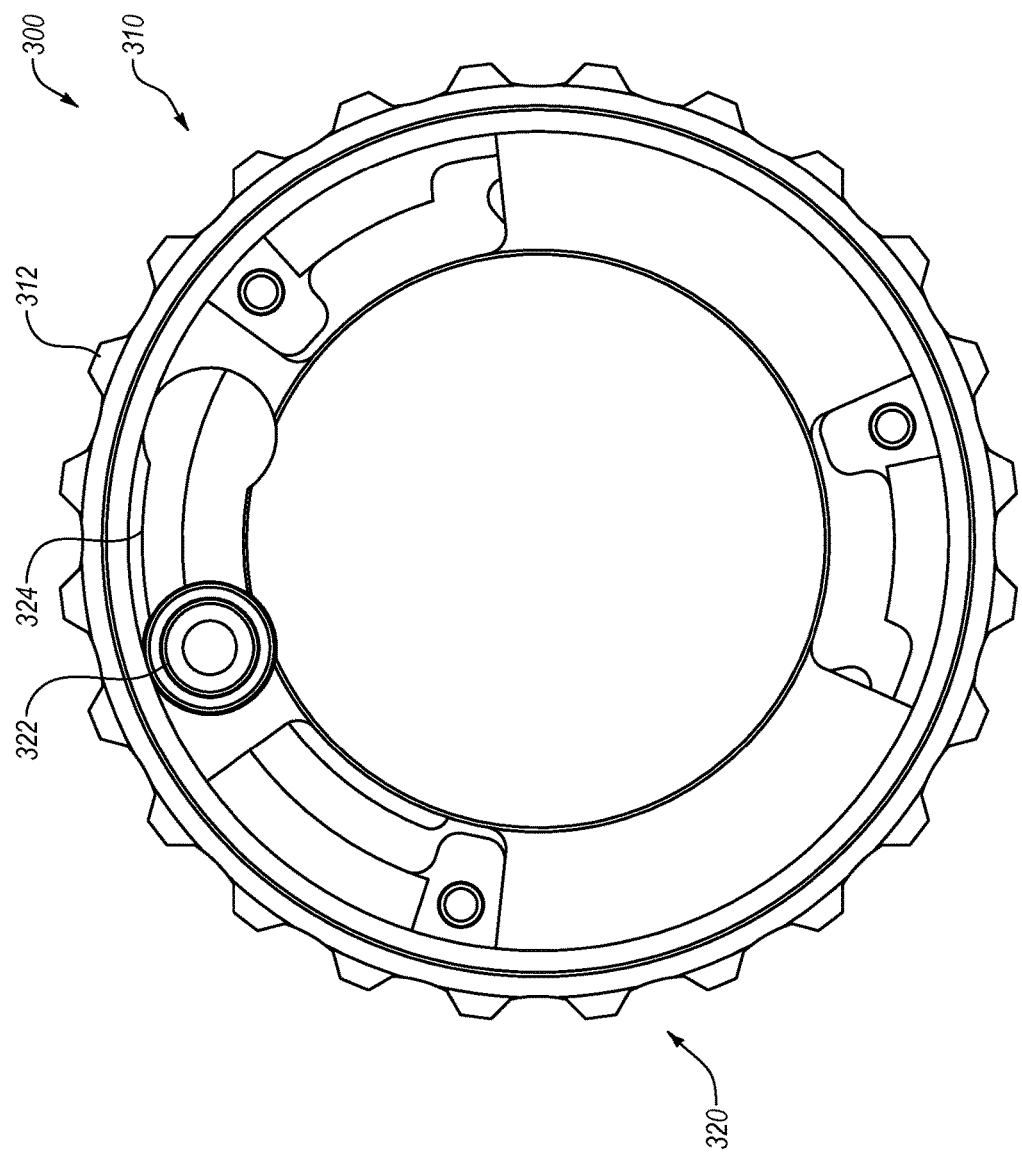

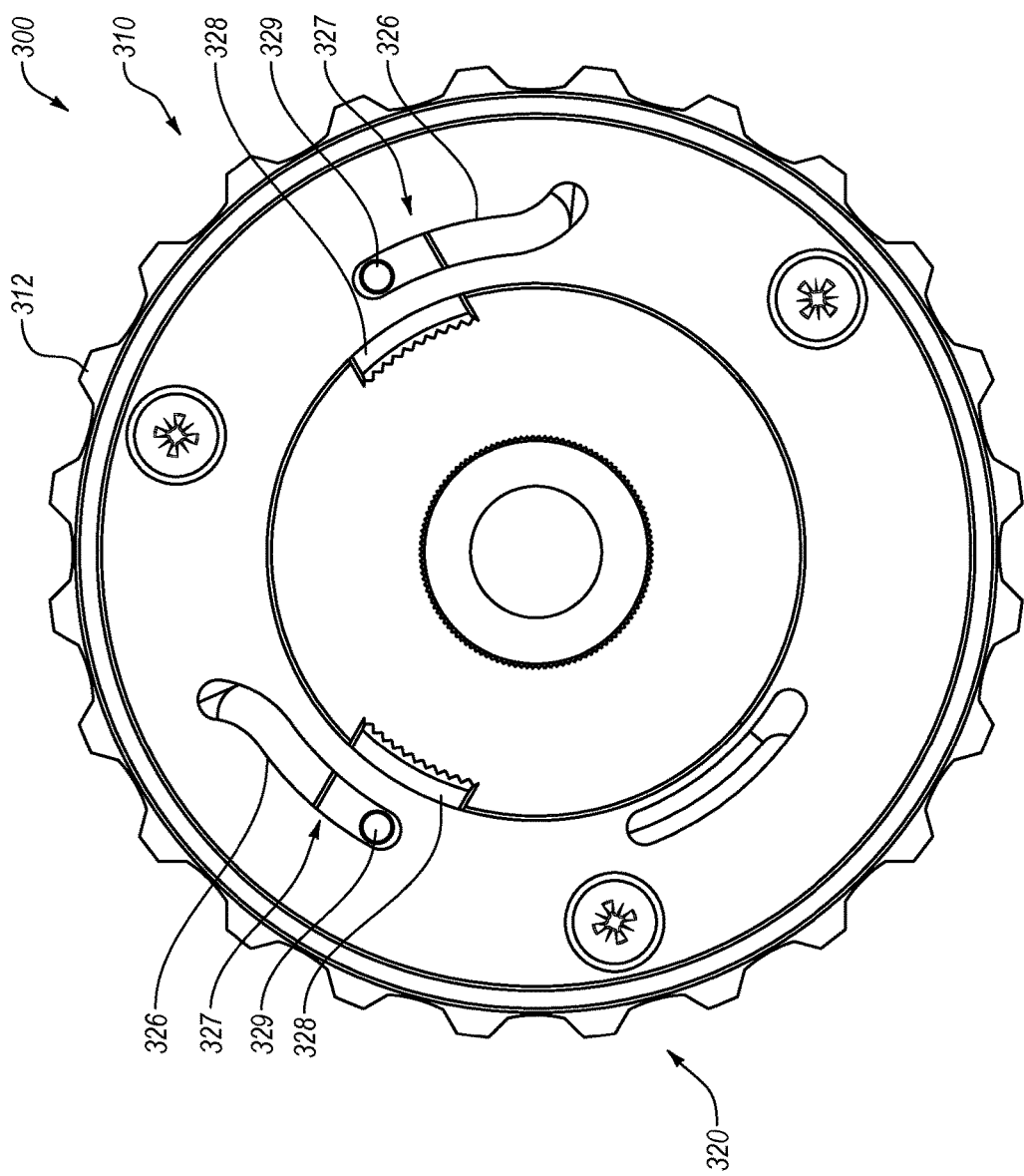

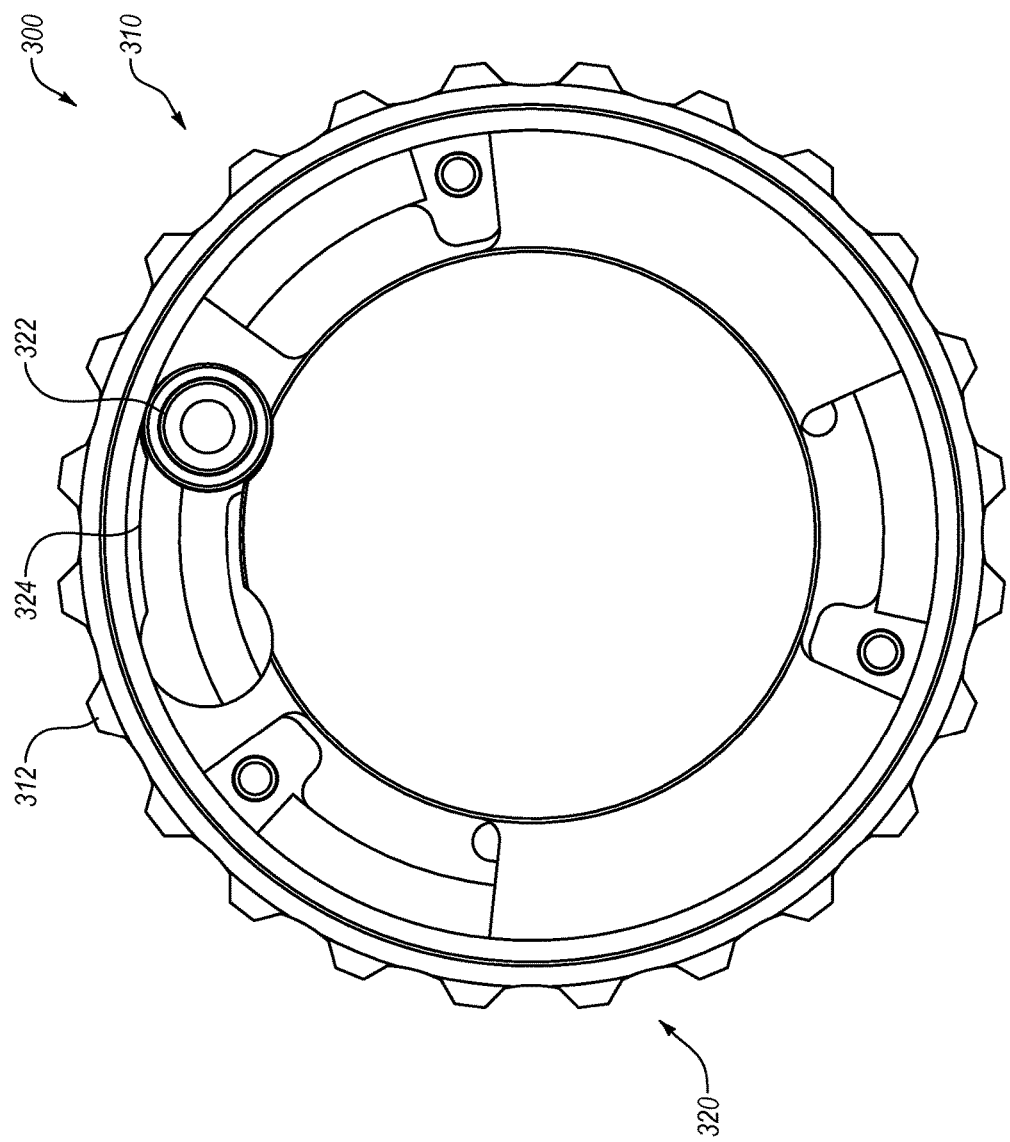

RIFLE SCOPE ELEVATION TURRET MECHANISM

RELATED APPLICATION

This application claims priority under 35 U.S.C. § 119 to U.S. Provisional Application No. 62/035,105, filed Aug. 8, 2014, the entire disclosure of which is incorporated herein by reference.

SUMMARY

A scope turret according to some embodiments may include a dial assembly that is configured to adjust point of aim optics inside a scope and to rotate about a rotational axis that is perpendicular to a longitudinal axis of the scope. The scope turret may also include an adjustable stop assembly configured to prevent the dial assembly from rotating in one direction. The adjustable stop assembly may be externally-adjustable or internally-adjustable. The adjustable stop assembly may include a nut assembly that is selectively coupled to the dial assembly through an engagement mechanism. The nut assembly may be configured to rotate with the dial assembly while the engagement mechanism is in an engaged position. The nut assembly may not be configured to rotate with the dial assembly while the engagement mechanism is in a disengaged position. The nut assembly may define an internal open space and a first set of inside diameter threads with a first diameter and a second set of inside diameter threads having a second diameter that is different from the first diameter. The adjustable stop assembly may further include a traveler that defines an internal open space. The traveler may be positioned at least partially within the internal open space defined by the nut assembly. The traveler may include a first set of outside diameter threads that are configured to engage the first set of inside diameter threads of the nut assembly. The traveler may be rotationally coupled to the dial assembly and translatably coupled to the nut assembly such that the traveler is configured to rotate with the dial assembly and the nut assembly while the engagement mechanism is in the engaged position and the traveler is configured to rotate with the dial assembly and translate relative to the nut assembly while the engagement mechanism is in the disengaged position. The adjustable stop assembly may further include a bolt positioned at least partially within the internal open space defined by the traveler. The bolt may include a second set of outside diameter threads that are configured to engage the second set of inside diameter threads of the nut assembly. The bolt may be translatably coupled to the nut assembly such that the bolt translates without rotation relative to the nut assembly while the engagement mechanism is in the engaged position. The traveler may also include an engagement tab and the bolt may also include a stop tab. The dial assembly may be prevented from rotation in one direction while the engagement tab and stop tab are in contact. The engagement mechanism may comprise at least one set screw that is configured to selectively couple the dial assembly with the nut assembly. The nut assembly may include a spline ring. The engagement mechanism may include one or more toothed segments that are configured to engage the spline ring while the engagement mechanism is in the engaged position. The dial assembly may not be configured to translate relative to the scope during rotation of the dial assembly.

A scope turret according to some embodiments may include a dial assembly that is configured to adjust point of aim optics inside a scope and to rotate about a rotational axis that is perpendicular to a longitudinal axis of the scope. The turret may also include a nut assembly that includes a spline ring. The turret may further include an engagement mechanism that includes one or more teeth segments that are configured to selectively couple the dial assembly to the nut assembly by engaging the spline ring such that the nut assembly is configured to rotate with the dial assembly while the engagement mechanism is in an engaged position and the nut assembly is not configured to rotate with the dial assembly while the engagement mechanism is in a disengaged position. The dial assembly may not be configured to translate relative to the scope during rotation of the dial assembly. The engagement mechanism may include a button that is configured to slide between the engaged position in which the teeth segments engage the spline ring and the disengaged position in which the teeth segments do not engage the spline ring. The button may be configured to slide between the engaged position and the disengaged position while the button is in a depressed state relative to the dial assembly. The button may be prevented from sliding between the engaged position and the disengaged position while not in the depressed state. The button may be configured to be depressed by pressing a pointed object against the button. The nut assembly may define an internal open space, a first set of inside diameter threads with a first diameter, and a second set of inside diameter threads having a second diameter that is different from the first diameter. The scope turret may also include a traveler that defines an internal open space and that is positioned at least partially within the internal open space defined by the nut assembly. The traveler may include a first set of outside diameter threads that are configured to engage the first set of inside diameter threads of the nut assembly. The traveler may be rotationally coupled to the dial assembly and translatably coupled to the nut assembly such that the traveler is configured to rotate with the dial assembly and the nut assembly while the engagement mechanism is in the engaged position and the traveler is configured to rotate with the dial assembly and translates relative to the nut assembly while the engagement mechanism is in the disengaged position. The scope turret may further include a bolt that is positioned at least partially within the internal open space defined by the traveler and includes a second set of outside diameter threads that are configured to engage the second set of inside diameter threads of the nut assembly. The bolt may be translatably coupled to the nut assembly such that the bolt translates without rotation relative to the nut assembly while the engagement mechanism is in the engaged position. The traveler may include an engagement tab and the bolt may include a stop tab. The dial assembly may be prevented from rotation in one direction while the engagement tab and stop tab are in contact.

A scope turret according to some embodiments may include a dial assembly that is configured to adjust point of aim optics inside a scope and to rotate about a rotational axis that is perpendicular to a longitudinal axis of the scope. The dial assembly may be further configured to translate along the rotational axis between a locked position and an unlocked position. The scope turret may also include a locking mechanism that includes one or more springs that selectively bias the dial assembly toward the locked position. The locking mechanism may include a lever adjustable between a first position and a second position. The locking mechanism may be configured to prevent the dial assembly from rotating in either direction about the rotational axis while the dial assembly is in the locked position and the locking mechanism may be configured to allow the dial assembly to rotate in either direction about the rotational axis while the dial assembly is in the unlocked second position. The one or more springs may bias the dial assembly toward the locked position while the lever is in the first position and the one or more springs may not bias the dial assembly toward the locked position while the lever is in the second position. The locking mechanism may further include a nut assembly that is coupled to the to the dial assembly such that the nut assembly is configured to rotate with the dial assembly and translate along the rotational axis between the locked position and the unlocked position with the dial assembly. The nut assembly may include an external locking ring with outward-facing splines. The locking mechanism may further include a saddle including an internal locking ring with inward-facing splines. The saddle and the internal locking ring may be positionally fixed with respect to the scope. The outward-facing splines of the external locking ring may be configured to engage with the inward-facing splines of the internal locking ring while the dial assembly is in the locked position. The outward-facing splines of the external locking ring may be configured to be disengaged from the inward-facing splines of the internal locking ring while the dial assembly is in the unlocked position. The locking mechanism may further include a switch selectable between an opened state and a closed state. Movement of the dial assembly between the locked position and the unlocked position may be configured to cause the switch to alternate between the opened state and the closed state. The switch may be configured to turn on an electronic feature of the scope while the dial assembly is in the unlocked position. The switch may be configured to turn off the electronic feature while the dial assembly is in the locked position.

DESCRIPTION OF DRAWINGS

FIG. 10 is a perspective view of another embodiment of the turret of the present disclosure.

FIG. 13A is a top view of the turret shown in FIG. 12 in a first positional configuration.

FIG. 13B is a top view of the turret shown in FIG. 12 in a second positional configuration.

FIG. 14A is a bottom view of the turret shown in FIG. 12 in a first positional configuration.

DETAILED DESCRIPTION

Figure 1:
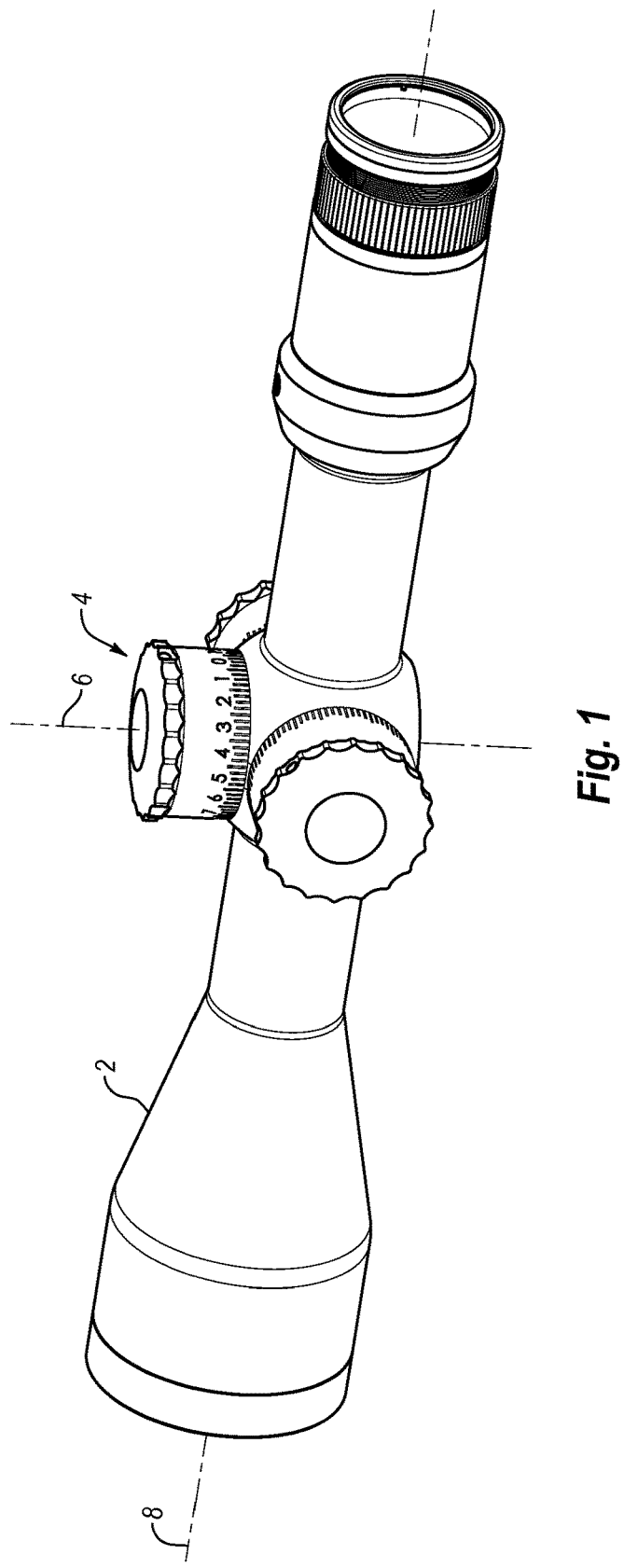
FIG. 1 is a perspective view of a gun scope having one embodiment of the turret of the present disclosure.

At a high level, this disclosure describes a turret that may be attached to a firearm scope. The scope turret may include a dial assembly that is configured to adjust point of aim optics inside a scope and to rotate about a rotational axis that is perpendicular to a longitudinal axis of the scope. The scope turret may also include an adjustable stop assembly configured to prevent the dial assembly from rotating in one direction. The adjustable stop assembly may be externally-adjustable or internally-adjustable. The adjustable stop assembly may include a nut assembly that is selectively coupled to the dial assembly through an engagement mechanism. The nut assembly may be configured to rotate with the dial assembly while the engagement mechanism is in an engaged position. The nut assembly may not be configured to rotate with the dial assembly while the engagement mechanism is in a disengaged position. The nut assembly may define an internal open space and a first set of inside diameter threads with a first diameter and a second set of inside diameter threads having a second diameter that is different from the first diameter. The adjustable stop assembly may further include a traveler that defines an internal open space. The traveler may be positioned at least partially within the internal open space defined by the nut assembly. The traveler may include a first set of outside diameter threads that are configured to engage the first set of inside diameter threads of the nut assembly. The traveler may be rotationally coupled to the dial assembly and translatably coupled to the nut assembly such that the traveler is configured to rotate with the dial assembly and the nut assembly while the engagement mechanism is in the engaged position and the traveler is configured to rotate with the dial assembly and translate relative to the nut assembly while the engagement mechanism is in the disengaged position. The adjustable stop assembly may further include a bolt positioned at least partially within the internal open space defined by the traveler. The bolt may include a second set of outside diameter threads that are configured to engage the second set of inside diameter threads of the nut assembly. The bolt may be translatably coupled to the nut assembly such that the bolt translates without rotation relative to the nut assembly while the engagement mechanism is in the engaged position. The traveler may also include an engagement tab and the bolt may also include a stop tab. The dial assembly may be prevented from rotation in one direction while the engagement tab and stop tab are in contact. The engagement mechanism may comprise at least one set screw that is configured to selectively couple the dial assembly with the nut assembly. The nut assembly may include a spline ring. The engagement mechanism may include one or more toothed segments that are configured to engage the spline ring while the engagement mechanism is in the engaged position. The dial assembly may not be configured to translate relative to the scope during rotation of the dial assembly.

In some alternative embodiments, the scope turret may include a dial assembly that is configured to adjust point of aim optics inside a scope and to rotate about a rotational axis that is perpendicular to a longitudinal axis of the scope. The turret may also include a nut assembly that includes a spline ring. The turret may further include an engagement mechanism that includes one or more teeth segments that are configured to selectively couple the dial assembly to the nut assembly by engaging the spline ring such that the nut assembly is configured to rotate with the dial assembly while the engagement mechanism is in an engaged position and the nut assembly is not configured to rotate with the dial assembly while the engagement mechanism is in a disengaged position. The dial assembly may not be configured to translate relative to the scope during rotation of the dial assembly. The engagement mechanism may include a button that is configured to slide between the engaged position in which the teeth segments engage the spline ring and the disengaged position in which the teeth segments do not engage the spline ring. The button may be configured to slide between the engaged position and the disengaged position while the button is in a depressed state relative to the dial assembly. The button may be prevented from sliding between the engaged position and the disengaged position while not in the depressed state. The button may be configured to be depressed by pressing a pointed object against the button. The nut assembly may define an internal open space, a first set of inside diameter threads with a first diameter, and a second set of inside diameter threads having a second diameter that is different from the first diameter. The scope turret may also include a traveler that defines an internal open space and that is positioned at least partially within the internal open space defined by the nut assembly. The traveler may include a first set of outside diameter threads that are configured to engage the first set of inside diameter threads of the nut assembly. The traveler may be rotationally coupled to the dial assembly and translatably coupled to the nut assembly such that the traveler is configured to rotate with the dial assembly and the nut assembly while the engagement mechanism is in the engaged position and the traveler is configured to rotate with the dial assembly and translates relative to the nut assembly while the engagement mechanism is in the disengaged position. The scope turret may further include a bolt that is positioned at least partially within the internal open space defined by the traveler and includes a second set of outside diameter threads that are configured to engage the second set of inside diameter threads of the nut assembly. The bolt may be translatably coupled to the nut assembly such that the bolt translates without rotation relative to the nut assembly while the engagement mechanism is in the engaged position. The traveler may include an engagement tab and the bolt may include a stop tab. The dial assembly may be prevented from rotation in one direction while the engagement tab and stop tab are in contact.

In other alternative embodiments, the scope turret may include a dial assembly that is configured to adjust point of aim optics inside a scope and to rotate about a rotational axis that is perpendicular to a longitudinal axis of the scope. The dial assembly may be further configured to translate along the rotational axis between a locked position and an unlocked position. The scope turret may also include a locking mechanism that includes one or more springs that selectively bias the dial assembly toward the locked position. The locking mechanism may include a lever adjustable between a first position and a second position. The locking mechanism may be configured to prevent the dial assembly from rotating in either direction about the rotational axis while the dial assembly is in the locked position and the locking mechanism may be configured to allow the dial assembly to rotate in either direction about the rotational axis while the dial assembly is in the unlocked second position. The one or more springs may bias the dial assembly toward the locked position while the lever is in the first position and the one or more springs may not bias the dial assembly toward the locked position while the lever is in the second position. The locking mechanism may further include a nut assembly that is coupled to the to the dial assembly such that the nut assembly is configured to rotate with the dial assembly and translate along the rotational axis between the locked position and the unlocked position with the dial assembly. The nut assembly may include an external locking ring with outward-facing splines. The locking mechanism may further include a saddle including an internal locking ring with inward-facing splines. The saddle and the internal locking ring may be positionally fixed with respect to the scope. The outward-facing splines of the external locking ring may be configured to engage with the inward-facing splines of the internal locking ring while the dial assembly is in the locked position. The outward-facing splines of the external locking ring may be configured to be disengaged from the inward-facing splines of the internal locking ring while the dial assembly is in the unlocked position. The locking mechanism may further include a switch selectable between an opened state and a closed state. Movement of the dial assembly between the locked position and the unlocked position may be configured to cause the switch to alternate between the opened state and the closed state. The switch may be configured to turn on an electronic feature of the scope while the dial assembly is in the unlocked position. The switch may be configured to turn off the electronic feature while the dial assembly is in the locked position.

Couplings according to some embodiments may be rotationally fixed, meaning the two coupled items rotate together. Couplings according to some embodiments may also be rotationally unfixed, meaning the two coupled items can rotate independently of each other. Further, couplings according to some embodiments may be translationally fixed, meaning the two coupled items move in a linear direction together. Further still, couplings according to some embodiments may be translationally unfixed, meaning the two coupled items can move linearly independently of each other.

FIG. 1 is a perspective view of a gun scope 2 with a turret 4 according to some embodiments. As can be seen in FIG. 1, turret 4 is secured to a top surface of scope 2. In other embodiments, turret 4 may be secured in other locations on scope 2. For example, a turret may be secured to a lateral side surface of a scope. Turret 4 rotates about an axis 6 that is perpendicular to a longitudinal or horizontal axis 8 that runs through the length of scope 2. Axis 6 or the axis about which a turret rotates is referred to herein as the "vertical axis." Axis 6 and its parallels are generally referred to herein as "vertical." Axis 8 or the axis that runs through the length of a scope body on which a turret 4 is mounted is referred to herein as the "longitudinal axis" or "horizontal axis." Axis 8 and its parallels are generally referred to herein as "horizontal."

Figure 2:
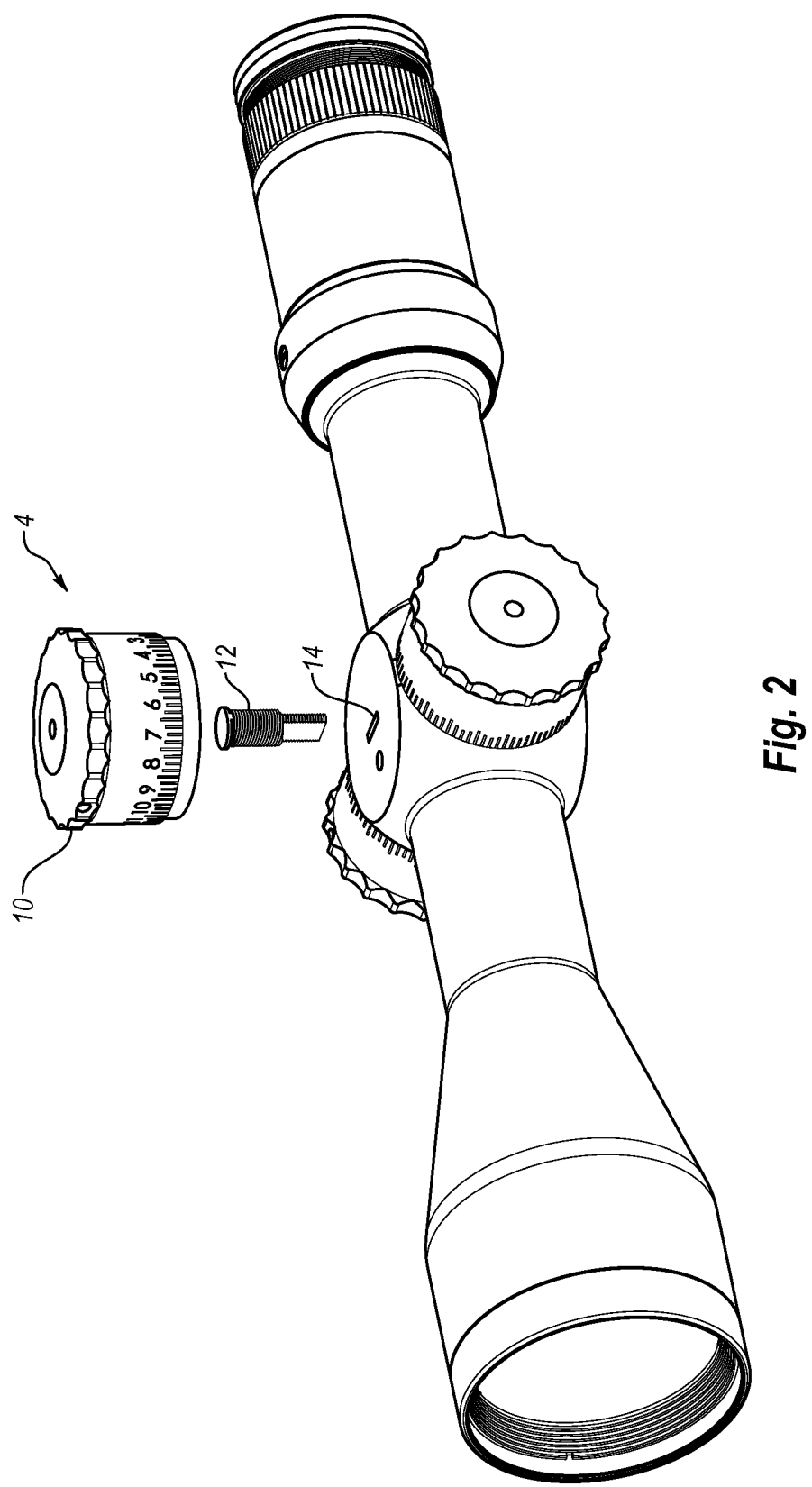
FIG. 2 is a partial exploded view of the gun scope and turret shown in FIG. 1.

FIG. 2 is a partial exploded view of turret 4 and shows a dial assembly 10 and a bolt 12 according to some embodiments. FIG. 2 also illustrates a recess 14 in the top of scope 2 through which a portion of bolt 12 extends. While recess 14 is rectangular in shape, it may be of any shape that is sized to accommodate all or a portion of bolt 12. For example, according to some embodiments, recess 14 may be circular and include a series of vertical splines that engage with splines on bolt 12.

Figure 3:
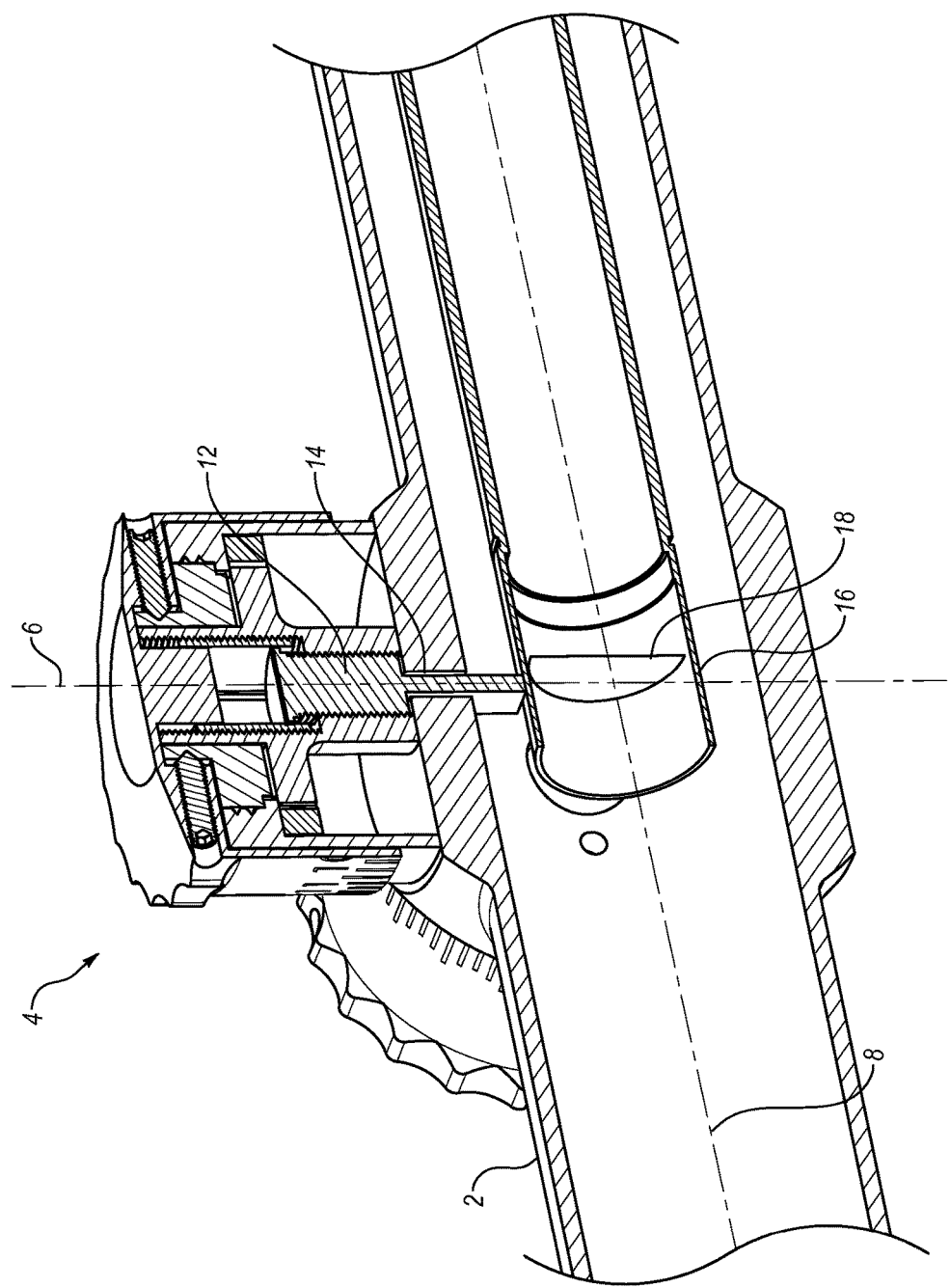
FIG. 3 is a side cutaway view of the gun scope and turret shown in FIG. 1 and FIG. 2.

FIG. 3 is a side cutaway view of scope 2 and turret 4 according to some embodiments. As can be seen in FIG. 3, bolt 12 extends through recess 14 and into scope 2 where it engages an erector tube 16, which may have a specific adjustment range. Erector tube 16 may include one or more lenses or optical elements 18 and an aiming reticle in the first focal (image) plane and/or in the second focal (image) plane. Rotation of turret 4 about axis 6 may cause bolt 12 to translate, or move linearly without rotation, along axis 6 and relative to scope 2. This translational movement of bolt 12 may cause erector tube 16 and optical element 18 to also move within scope 2. Movement of erector tube 16 within its adjustment range causes an adjustment to the point-of-aim of the optics of scope 2.

Figure 4A:
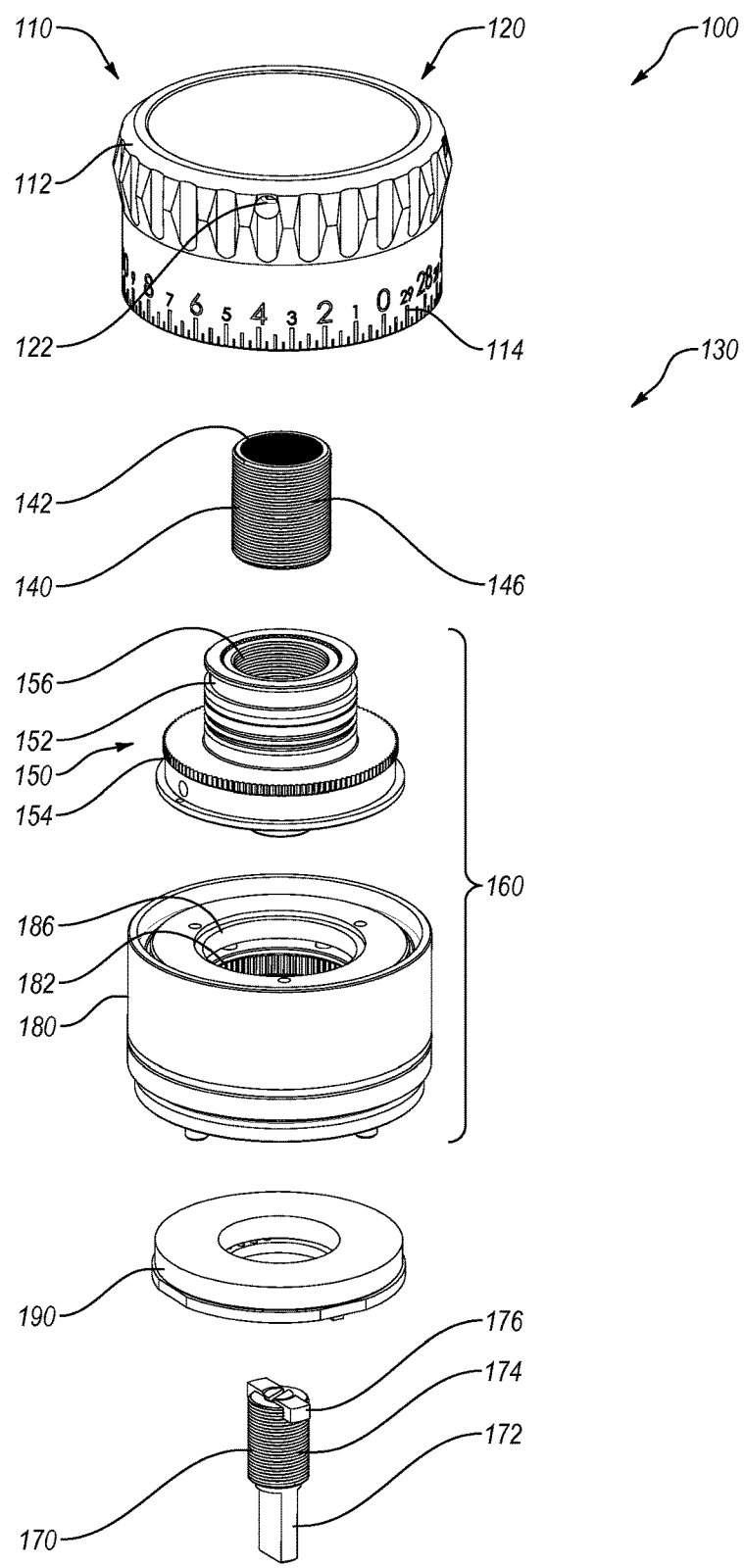
FIG. 4A is an exploded perspective view of one embodiment of the turret of the present disclosure.
Figure 4B:
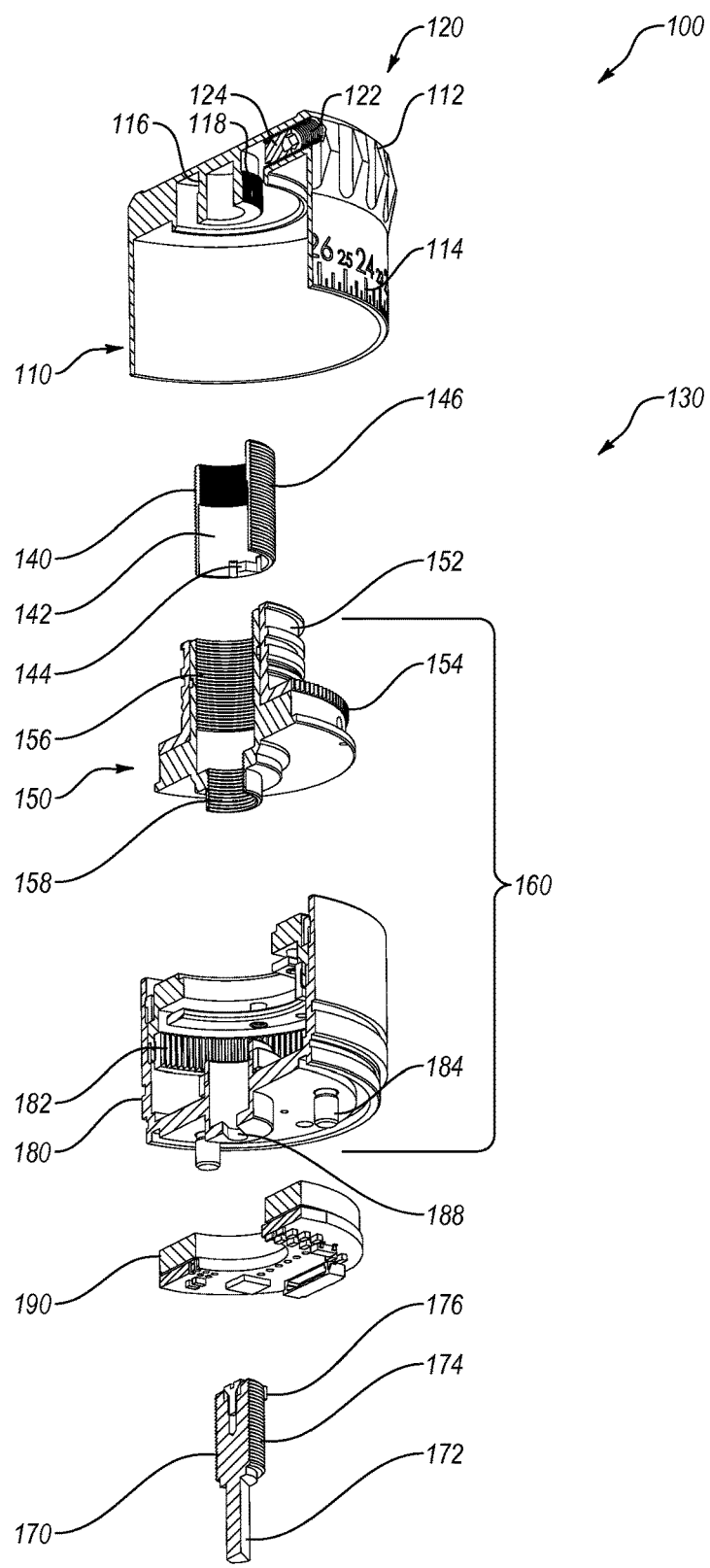
FIG. 4B is a cutaway and exploded perspective view of the turret shown in FIG. 4A.

FIG. 4A is an exploded perspective view of a turret 100 having a dial assembly 110 and an adjustable stop assembly 130 according to some embodiments. FIG. 4B is a cutaway and exploded perspective view of turret 100. Adjustable stop assembly 130 of turret 100 may be configured to prevent dial assembly 110 from rotating in one direction according to some embodiments. Adjustable stop assembly 130 may include three separate components: a traveler 140, a nut assembly 150, and a bolt 170. Turret 100 may also include a saddle 180 and an encoder 190.

In some embodiments, dial assembly 110 may be configured to adjust point of aim optics inside a scope on which turret 100 is mounted and to rotate about a rotational axis that is perpendicular to a longitudinal axis of the scope. Dial assembly 110 may include a casing 112 that defines an internal open space into which all or parts of the traveler 140, nut assembly 150, bolt 170, saddle 180, and encoder 190 may be contained when turret 100 is assembled. Casing 112 may include external markings 114 that include numbers that indicate the rotational position of dial assembly 110 relative to the scope on which turret 100 is mounted. These markings may include a "zero-mark" that may correspond to a specific point of aim configuration inside the scope. In some embodiments, the zero-mark may be at the lowest or a relatively low position and, at the zero-mark, the dial assembly may be prevented from rotating any further in one direction. Dial assembly 110 may also include a stud 116 that extends downwardly from a lower surface of the top of casing 112. Casing 112 and stud 116 may be integrally formed or may be formed separately and secured together. Stud 116 may include an exterior surface 118. Part or all of exterior surface 118 may include a pattern of vertical striations.

In some embodiments, dial assembly 110 may also include an engagement mechanism 120. Engagement mechanism 120 of dial assembly 110 may include a cylindrical threaded aperture 122 in casing 112, in which a set screw 124 may reside. Set screw 124 may be configured to move within aperture 122 by rotating set screw 124 with an appropriate tool (see also FIG. 5).

In some embodiments, traveler 140 may have a cylindrical shape with open ends and may include an inner surface 142, which defines an internal open space. A portion of inner surface 142 may include a pattern of vertical striations that are sized and shaped to match with the pattern of vertical striations on exterior surface 118 of stud 116. Traveler 140 also includes an engagement tab 144 that protrudes from inner surface 142. Traveler 140 may further include a threaded outer surface 146. Traveler 140 may be configured to rotate with dial assembly 110 and also translate in a vertical direction relative to dial assembly 110. Threaded outer surface 146 and the threads on other components described herein may have any configuration. For example, the threads may have a right-handed pattern or a left-handed pattern.

Figure 5:
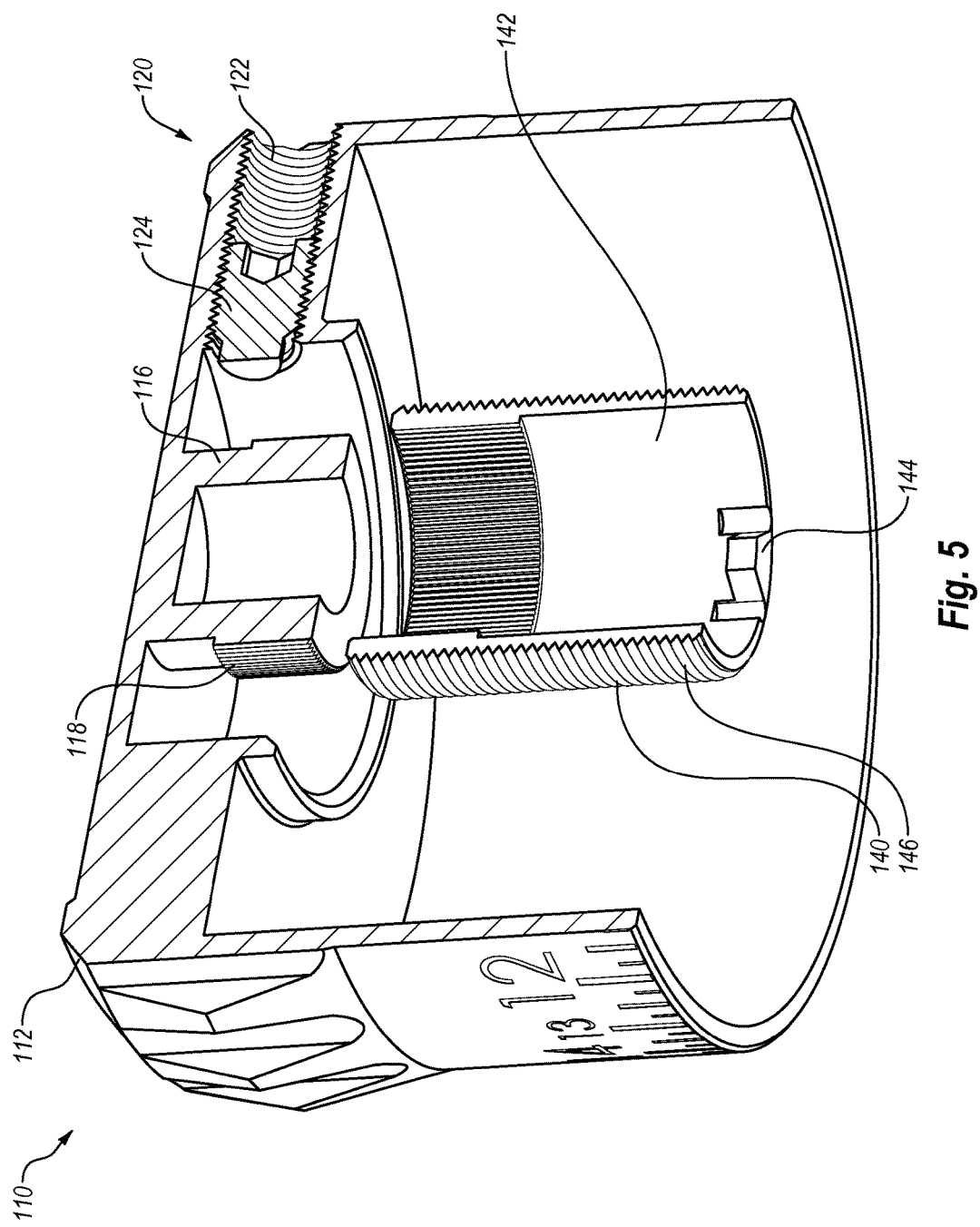
FIG. 5 is an cutaway and exploded perspective view of certain components of the turret shown in FIGS. 4A and 4B.

An interaction and connection between dial assembly 110 and traveler 140 is illustrated in FIG. 5, which is a perspective cutaway view of dial assembly 110 and traveler 140. As can be seen in FIG. 5, a portion of stud 116 may be shaped and sized to fit within the internal open space defined by traveler 140. The vertical striations on exterior surface 118 of stud 116 may interconnect with the vertical striations on inner surface 142 of traveler 140. The engagement of these vertical striations may create a rotationally fixed coupling between dial assembly 110 and traveler 140 such that when dial assembly 110 rotates about a vertical axis, traveler 140 also rotates about that vertical axis. The vertical striations on exterior surface 118 of stud 116 may also create a translationally unfixed coupling between dial assembly 110 and traveler 140 such that traveler 140 can move vertically, or up and down, relative to dial assembly 110. In some embodiments, dial assembly 110 does not translate relative to a scope on which turret 100 is mounted as dial assembly 110 rotates. Thus, dial assembly 110 may be vertically non-raising when rotated.

In some embodiments, a stud may have a polygonal external shape that interconnects with an opening in the top of a traveler having the same polygonal shape. In some embodiments, a stud may have a keyway or an elongated detent that engages a traveler. Like the vertical striations embodiment illustrated in FIG. 5, the keyway, detent, or polygonal shape configurations may cause a traveler to be rotationally fixed with a dial assembly while at the same time translationally unfixed, allowing the traveler to move vertically relative to the dial assembly.

Referring again to FIGS. 4A and 4B, bolt 170 may be sized to fit at least partially within the internal open space defined by traveler 140 according to some embodiments. Movement of bolt 170 may be limited to translational movement in a vertical direction relative to dial assembly 110. In some embodiments, bolt 170 may not rotate relative to dial assembly 110. Bolt 170 may include a key portion 172 and a cylindrical shaft portion 174. Key portion 172 may extend into a scope to which turret 100 is secured. Key portion 172 may have a variety of different shapes. For example, in some embodiments, a key portion may have a polygonal shape or be cylindrical and include vertical splines. Vertical movement of bolt 170 may adjust point of aim optics within the scope. Cylindrical shaft portion 174 may include a threaded outer surface. Bolt 170 may further include a stop tab 176 that protrudes from shaft portion 174 at or near the top of shaft portion 174. Lateral sides of stop tab 176 and engagement tab 144 of traveler 140 are configured to contact and provide a hard stop for dial assembly 110 such that dial assembly 110 may be prevented from further rotation in one direction when a lateral side of stop tab 176 is in contact with a lateral side of engagement tab 144.

In some embodiments, nut assembly 150 may be selectively coupled to dial assembly 110 through engagement mechanism 120. Nut assembly 150 may include a horizontal channel 152 that is sized and shaped to receive a set screw 124. When set screw 124 is in an engaged position with channel 152, nut assembly 150 may be rotationally fixed with dial assembly 110 such that nut assembly 150 rotates with dial assembly 110. When set screw 124 is in a disengaged position with channel 152, nut assembly 150 may be rotationally unfixed with dial assembly 110 such that nut assembly 150 does not rotate with dial assembly 110. Engagement mechanism 120 allows the components of stop assembly 130 to be adjusted by selectively engaging engagement mechanism 120 and rotating dial assembly 110. In this configuration, adjustable stop assembly 130 is internally-adjustable, as adjustments can be made to stop assembly 130 while components of stop assembly 130 are internal to dial assembly 110.

In some embodiments, nut assembly 150 may also include an external locking ring 154 that may include a series of outward-facing splines. External locking ring 154 is part of locking mechanism 160. Nut assembly 150 may further include a first cylindrical internal surface 156 and a second cylindrical internal surface 158, which define an internal open space. First cylindrical internal surface 156 and second cylindrical internal surface 158 may each include threads. The diameter of first cylindrical internal surface 156 may be larger than the diameter of second cylindrical internal surface 158. A portion of traveler 140 may be sized to fit within the open space defined by nut assembly 150. Specifically, all or part of traveler 140 may fit within the open space defined by the first cylindrical internal surface 156 of nut assembly 150. The threads on first cylindrical internal surface 156 may be configured to engage the threads on outer surface 146 of traveler 140. Additionally, all or a part of shaft portion 174 of bolt 170 may fit within the open space defined by the second cylindrical internal surface 158 of nut assembly 150. The threads on second cylindrical internal surface 158 may be configured to engage the threads on the outer surface of shaft portion 174 of bolt 170.

In some embodiments, saddle 180 may be cylindrical in shape and may define an internal open space. For example, saddle 180 may include, within the internal open space, an internal locking ring 182 having inward-facing splines. Saddle 180 may be mountable to a scope body via one or more mounting posts 184. In some embodiments, saddle 180 and internal locking ring 182 may remain in a fixed position relative to a scope body on which saddle 180 is mounted regardless of any rotation of any other components within turret 100. Internal locking ring 182 is part of locking mechanism 160. Saddle 180 may also include, within the internal open space, a portion of nut assembly 150 and a portion of bolt 170. In some embodiments a portion of nut assembly 150 may not be included within the internal open space defined by saddle 180 and may extend out of the open space defined by saddle 180 though a top opening 186 in the top of saddle 180. In some embodiments, a portion of bolt 170 not included within the internal open space defined by saddle 180 may extend out of the open space defined by saddle 180 through a bottom opening 188 in the bottom of saddle 180.

In some embodiments, all or a portion of encoder 190 may also be included within the internal open space defined by saddle 180. Like saddle 180, encoder 190 may remain in a fixed position relative to a scope body on which saddle 180 is mounted regardless of any rotation of any other components within turret 100. Encoder 190 may be a rotary or linear, absolute or incremental, magnetic or optical encoder (linear or rotational) that may communicate electronically, for example, rotational information of turret 100 to a processor. A power source, such as a battery, may provide the necessary power to operate the encoder, processor, or another electronic feature. In alternative embodiments, a turret may not include any electronic features, but may be a purely mechanical device.

Figure 6:
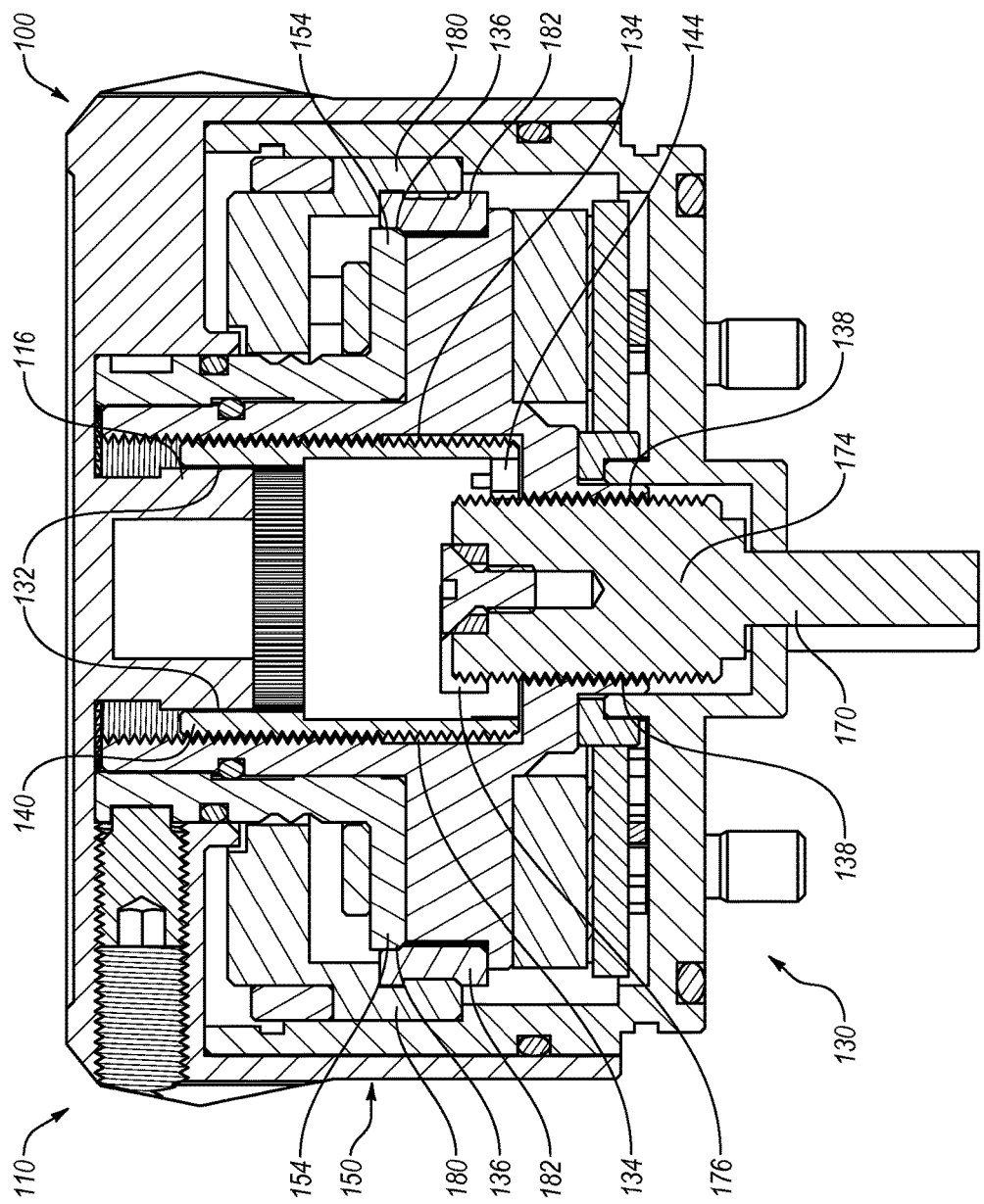
FIG. 6 is a side cutaway view of the turret shown in FIGS. 4A and 4B.

FIG. 6 is a side cutaway view of turret 100 and illustrates the different engagements between components of dial assembly 110 and internally-adjustable stop assembly 130 according to some embodiments. For example, vertical striation on the exterior surface of stud 116 may engage the vertical striations in the inner surface of traveler 140 at junction 132. The engagement at junction 132 may cause traveler 140 to rotate with dial assembly 110 and/or may allow traveler 140 to translate relative to dial assembly 110.

The threaded outer surface of traveler 140 may engage the threaded first internal surface of nut assembly 150 at junction 134. When engagement mechanism 120 is in a disengaged position (and nut assembly 150 does not rotate with dial assembly 110), the engagements at junction 132 and junction 134 may cause traveler 140 to rotate with dial assembly 110 and translate relative to both nut assembly 150 and dial assembly 110. When engagement mechanism 120 is in an engaged position (and nut assembly 150 rotates with dial assembly 110), the engagements at junction 132 and junction 134 may cause traveler 140 to rotate with both nut assembly 150 and dial assembly 110. However, in the disengaged position, in some embodiments, traveler 140 may not translate relative to either dial assembly 110 or nut assembly 150.

The outward-facing splines on external locking ring 154 of nut assembly 150 may engage the inward-facing splines on internal locking ring 182 of saddle 180 at junction 136. The threaded outer surface of cylindrical shaft portion 174 of bolt 170 may engage the threaded second cylindrical internal surface 158 of nut assembly 150 at junction 138. When engagement mechanism 120 is in an engaged position (and nut assembly 150 rotates with dial assembly 110), the engagement at junction 134 may cause bolt 170 to translate relative to nut assembly 150, traveler 140, and dial assembly 110 (all of which may rotate together).

Figure 7A:
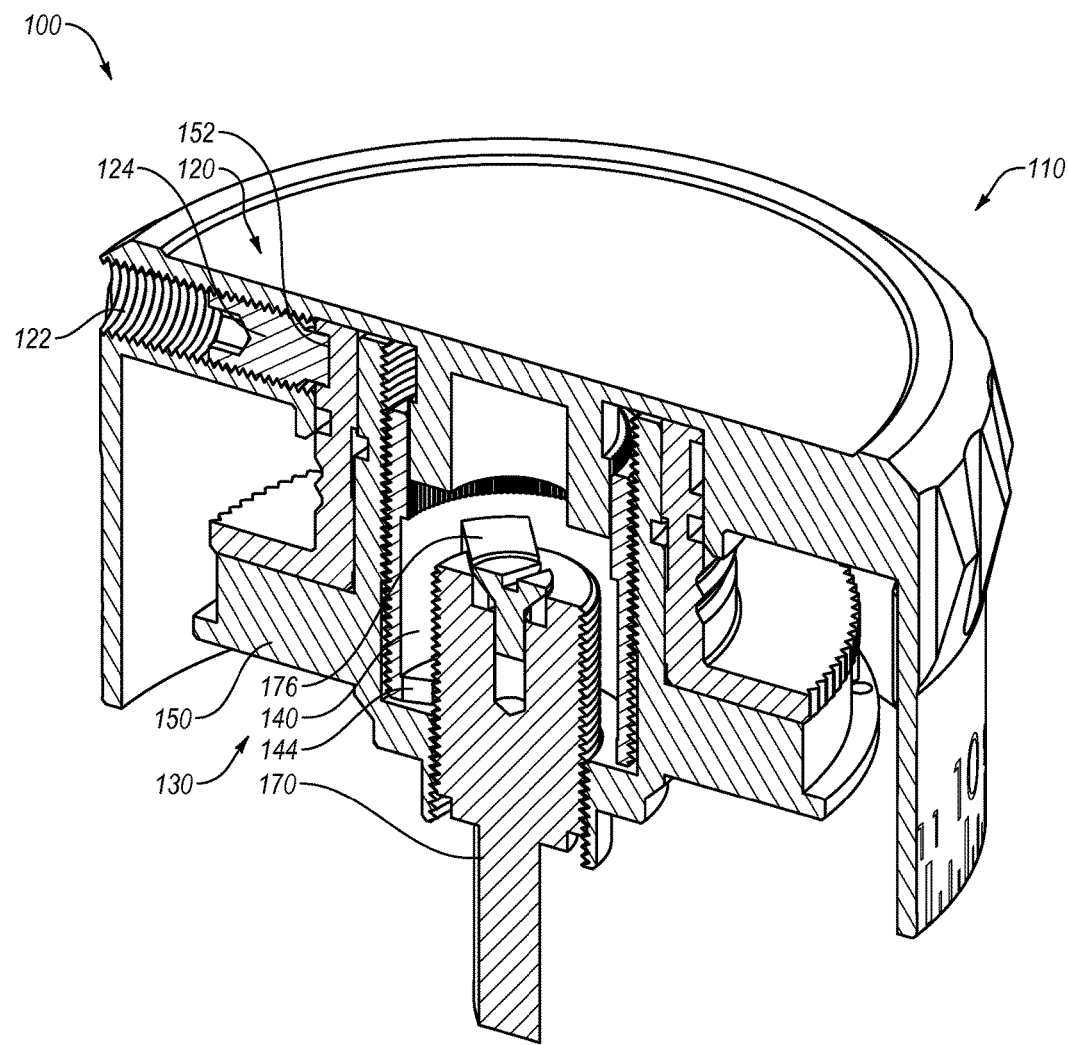
FIG. 7A is a cutaway perspective views of the turret shown in FIGS. 4A and 4B with internal components in a first positional configuration.
Figure 7B:
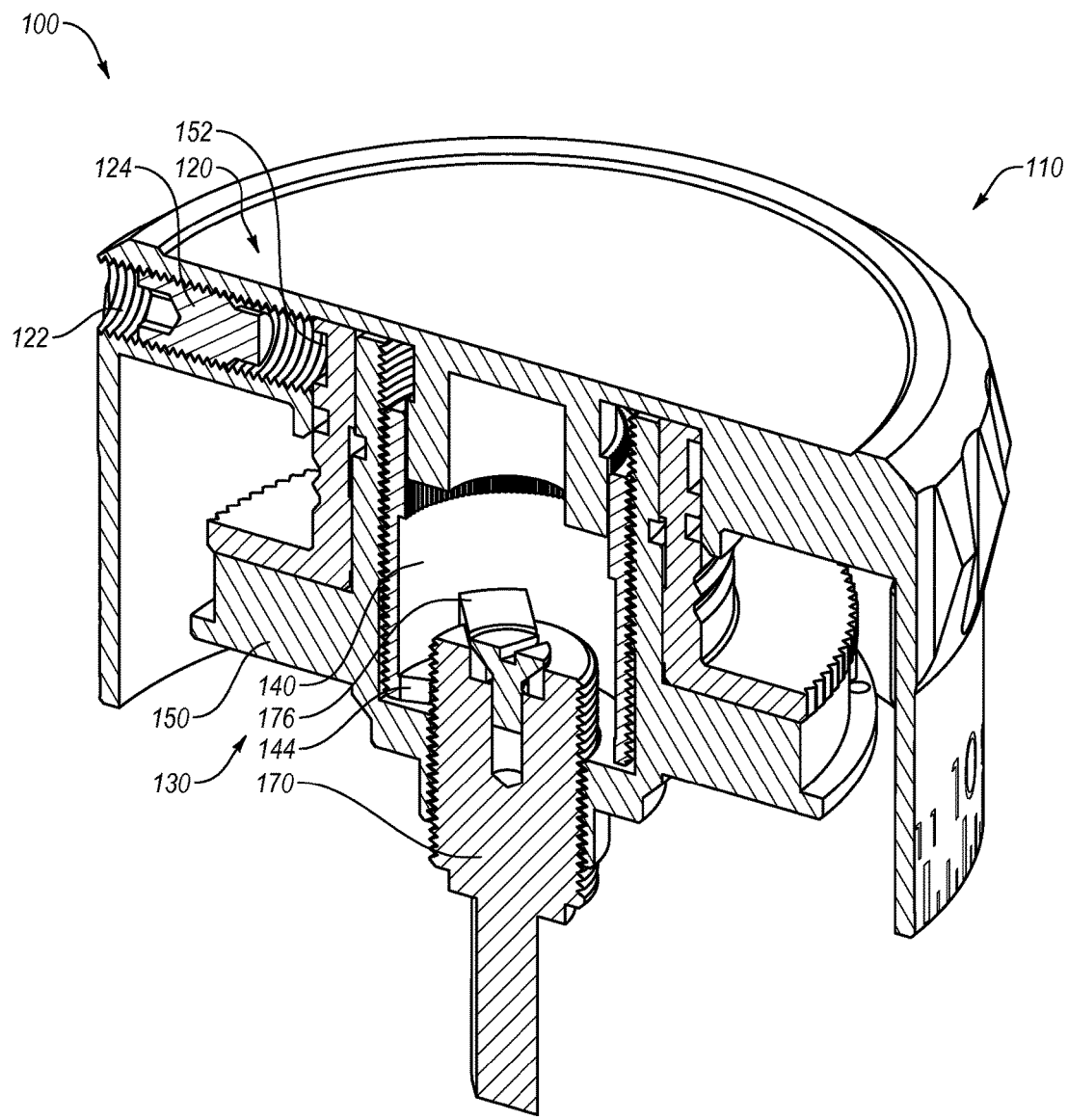
FIG. 7B is a cutaway perspective views of the turret shown in FIGS. 4A and 4B with internal components in a second positional configuration.

FIGS. 7A-7E illustrate cutaway perspective views of turret 100 and show dial assembly 110 (including engagement mechanism 120) and internally-adjustable stop assembly 130 (including traveler 140, nut assembly 150, and bolt 170) in different positional configurations according to some embodiments. In FIG. 7A, for example, engagement mechanism 120 is in an engaged position. In other words, set screw 124 is engaging channel 152 of nut assembly 150 causing nut assembly 150 to be rotationally fixed with dial assembly 110. In this configuration, when dial assembly 110 is rotated, traveler 140 and nut assembly 150 rotate with dial assembly 110, causing bolt 170 to translate relative to nut assembly 150, traveler 140, and dial assembly 110. For example, in FIG. 7A bolt 170 is shown in a first elevated position, which may be altered (for example, as shown in FIG. 7B) by rotating dial assembly 110. In practice, a user may take a rifle having a scope with turret 100 affixed thereto to a range to adjust the point-of-aim optics within the scope by translating bolt 170 as described above so that the point-of-impact corresponds to the point of aim.

In FIG. 7B, for example, bolt 170 is shown in a second lowered position. This second lowered position may correspond to the location of bolt 170 after the scope has been sighted in at a known distance. For example, the position of bolt 170 may correspond to the proper point-of-aim for a target that is located 200 yards away. Engagement mechanism 120 is in the disengaged position in FIG. 7B. In other words, set screw 124 is disengaged from channel 152 of nut assembly 150 thus causing nut assembly 150 to not rotate with dial assembly 110. In this configuration, when dial assembly 110 is rotated, traveler 140 rotates with dial assembly 110, but nut assembly 150 does not rotate and bolt 170 does not translate relative to nut assembly 150. In practice, in this configuration a user may rotate dial assembly 110 to raise traveler 140 from a first lowered position (for example, shown in FIG. 7B) to a second raised position (for example, shown in FIG. 7C).

Figure 7C:
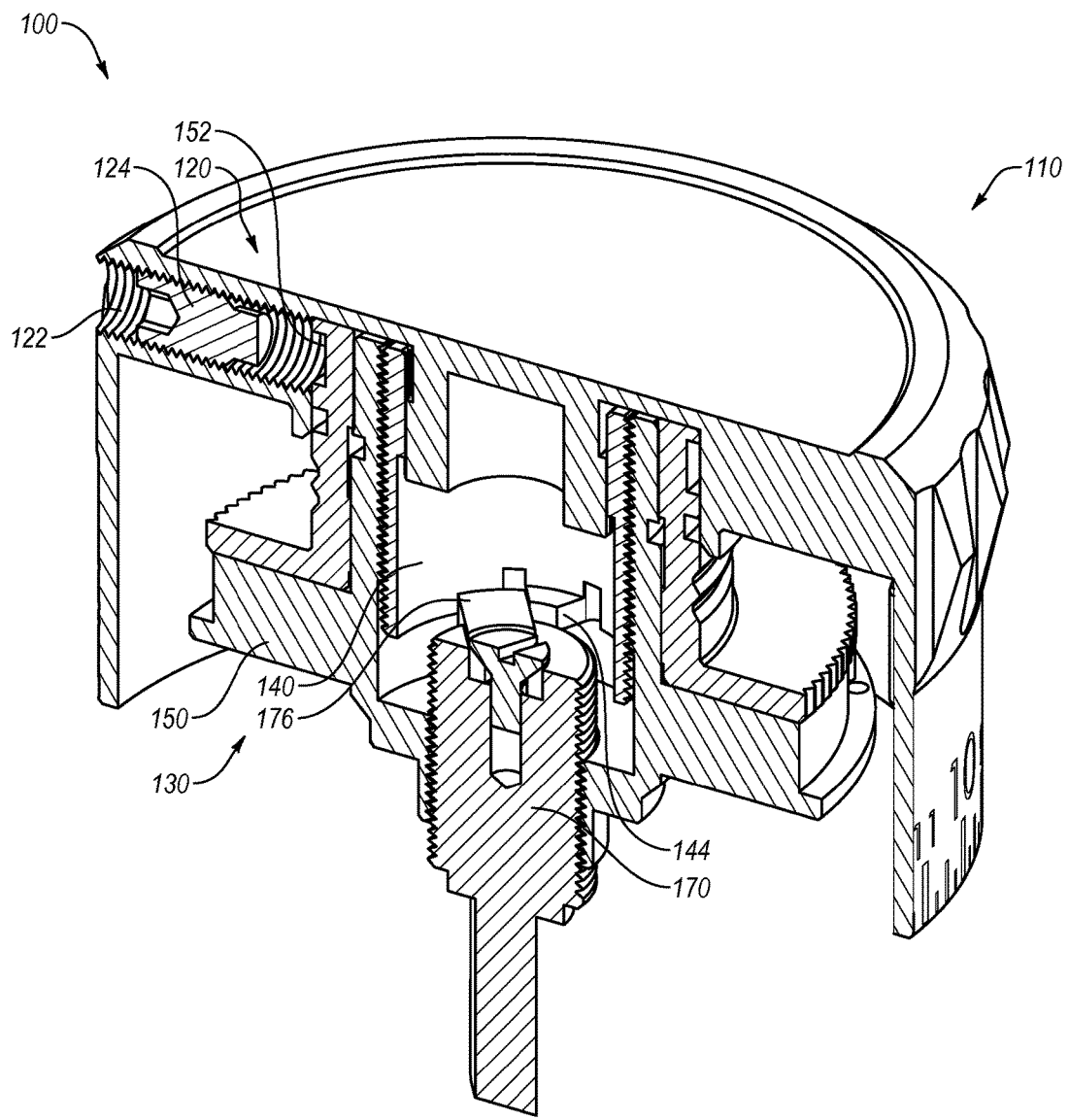
FIG. 7C is a cutaway perspective views of the turret shown in FIGS. 4A and 4B with internal components in a third positional configuration.
Figure 7D:
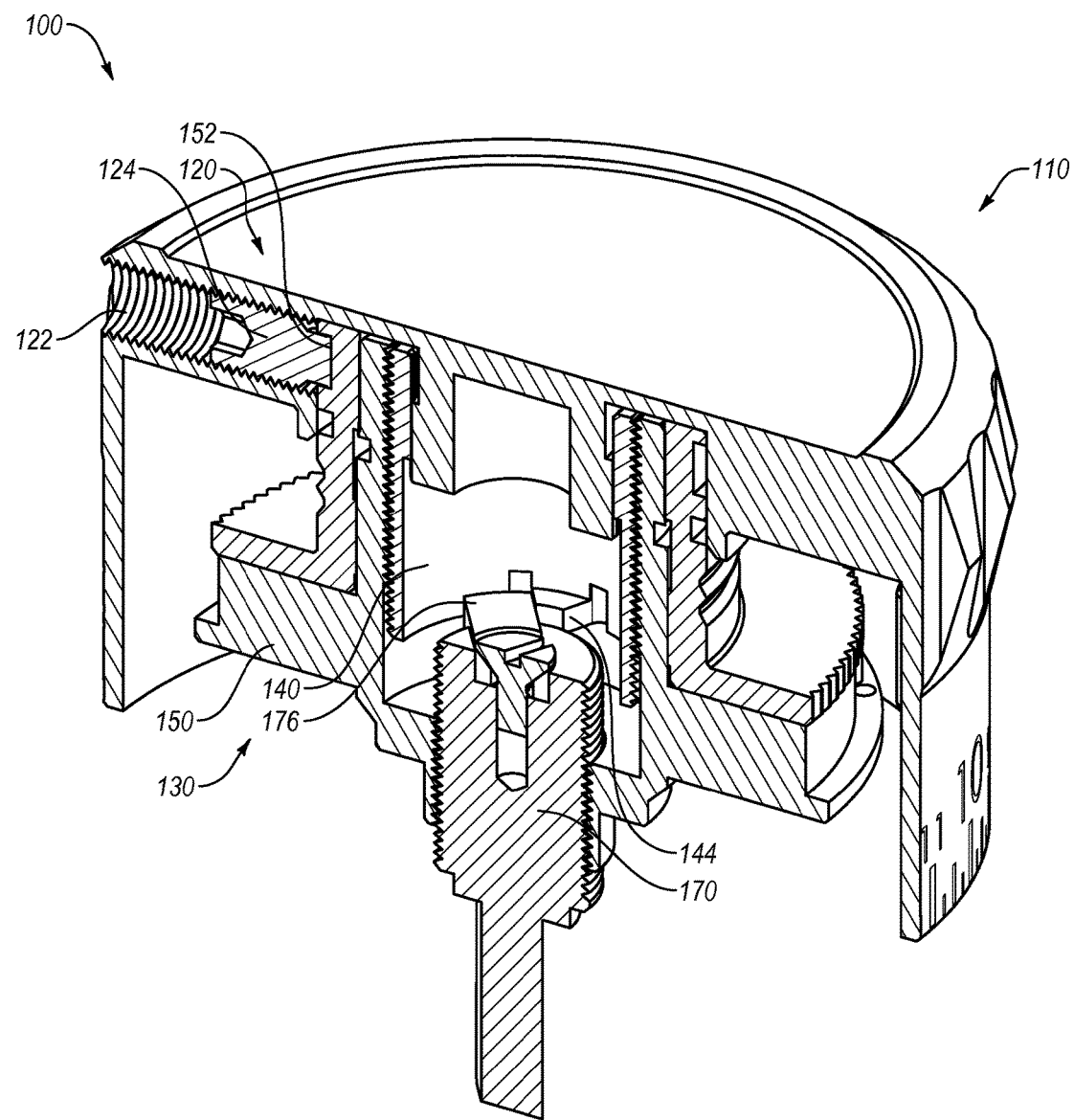
FIG. 7D is a cutaway perspective views of the turret shown in FIGS. 4A and 4B with internal components in a fourth positional configuration.

In FIG. 7C, for example, dial assembly 110 has been rotated to raise traveler 140 to a second raised position. In the second raised position of traveler 140, a lateral side of engagement tab 144 may be in contact with a lateral side of stop tab 176 of bolt 170. This contact may prevent traveler 140 and dial assembly 110 from further rotation in the direction that raises traveler 140. This position may correspond to the "zero-point." In practice, once the zero-point position is achieved (for example, as shown in FIG. 7C), the engagement mechanism 120 may be reset to the engaged position (for example, as shown in FIG. 7D). Stop tab 176 may be positioned on bolt 170 in such a way that when engagement tab 144 is in contact with stop tab 176, the zero-point corresponds to the engraved zero-mark on the external markings 114 of dial assembly 110. The zero-point can be reset by disengaging engagement mechanism 120 and rotating dial assembly 110 to change the position of traveler 140.

Figure 7E:
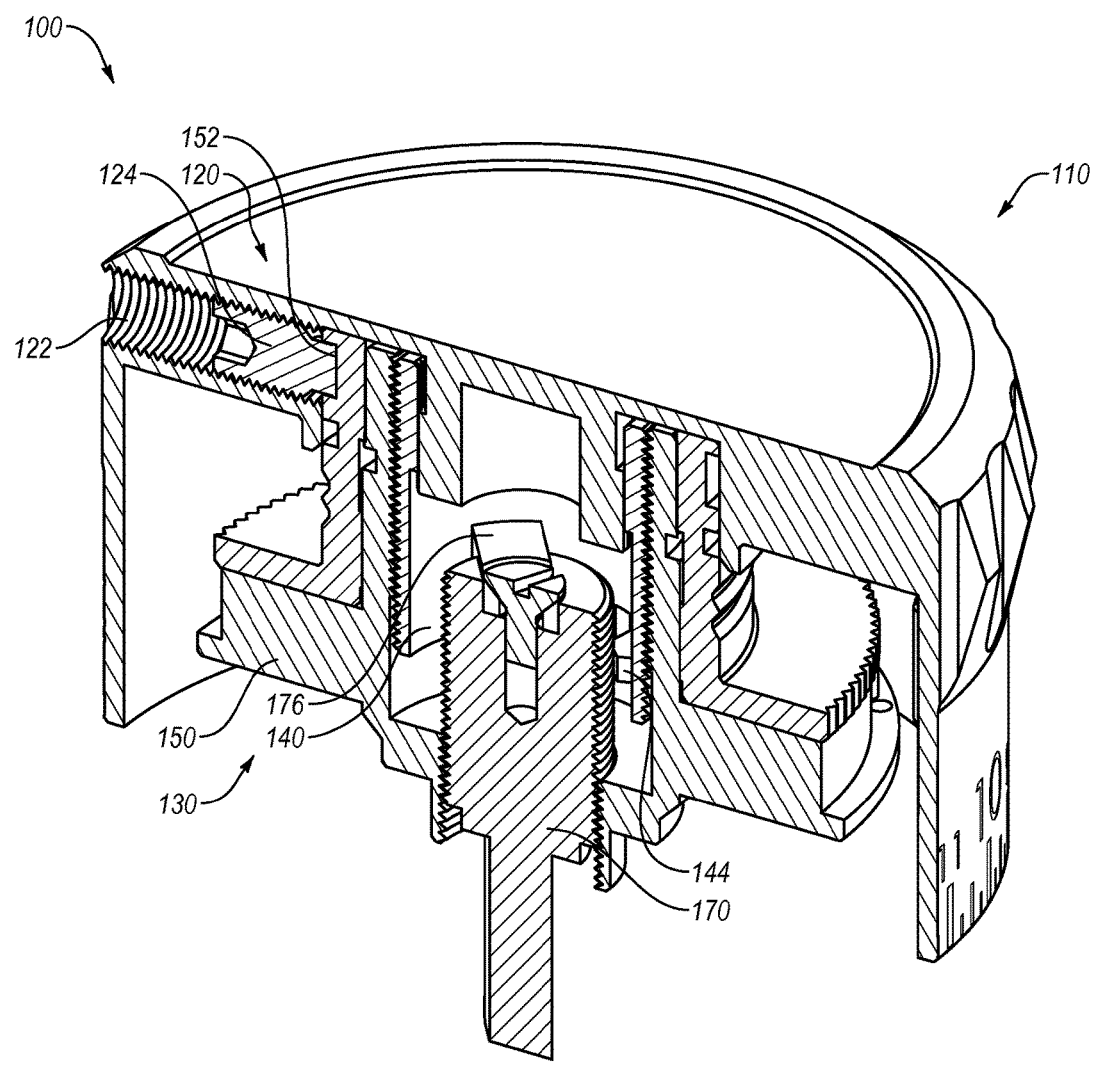
FIG. 7E is a cutaway perspective views of the turret shown in FIGS. 4A and 4B with internal components in a fifth positional configuration.

In FIG. 7D, for example, engagement mechanism 120 is in the engaged position, and nut assembly 150 will rotate with dial assembly 110 and traveler 140. Because nut assembly 150 and traveler 140 rotate together in this configuration, traveler 140 will not translate relative to nut assembly 150. Bolt 170, however, will translate relative to nut assembly 150 and traveler 140. However, because a lateral side of engagement tab 144 is in contact with a lateral side of stop tab 176, dial assembly 110 may not be able to rotate in the direction that lowers bolt 170, thus creating a "hard-stop" at the zero-point. In some embodiments, dial assembly 110 can only rotate in a direction that raises bolt 170. In practice, this hard-stop may be important because it may allow a user to rotate dial assembly 110 multiple rotations and raise bolt 170 (for example, as shown in FIG. 7E), thereby adjusting the point-of-aim optics in one direction (for example, so that the point-of-impact of a projectile corresponds to a longer distance than the zero-point distance). However, by rotating dial assembly 110 in a direction that lowers bolt 170, the user may always be able to return bolt 170 to the zero-point because stop tab 176 will make contact with engagement tab 144 at the zero-point, thereby preventing dial assembly 110 from further rotation in that direction. In other words, this feature may provide for a repeatable rotational coincidence of the zero-point through a hard stop created by the contact between engagement tab 144 and stop tab 176.

Figure 8:
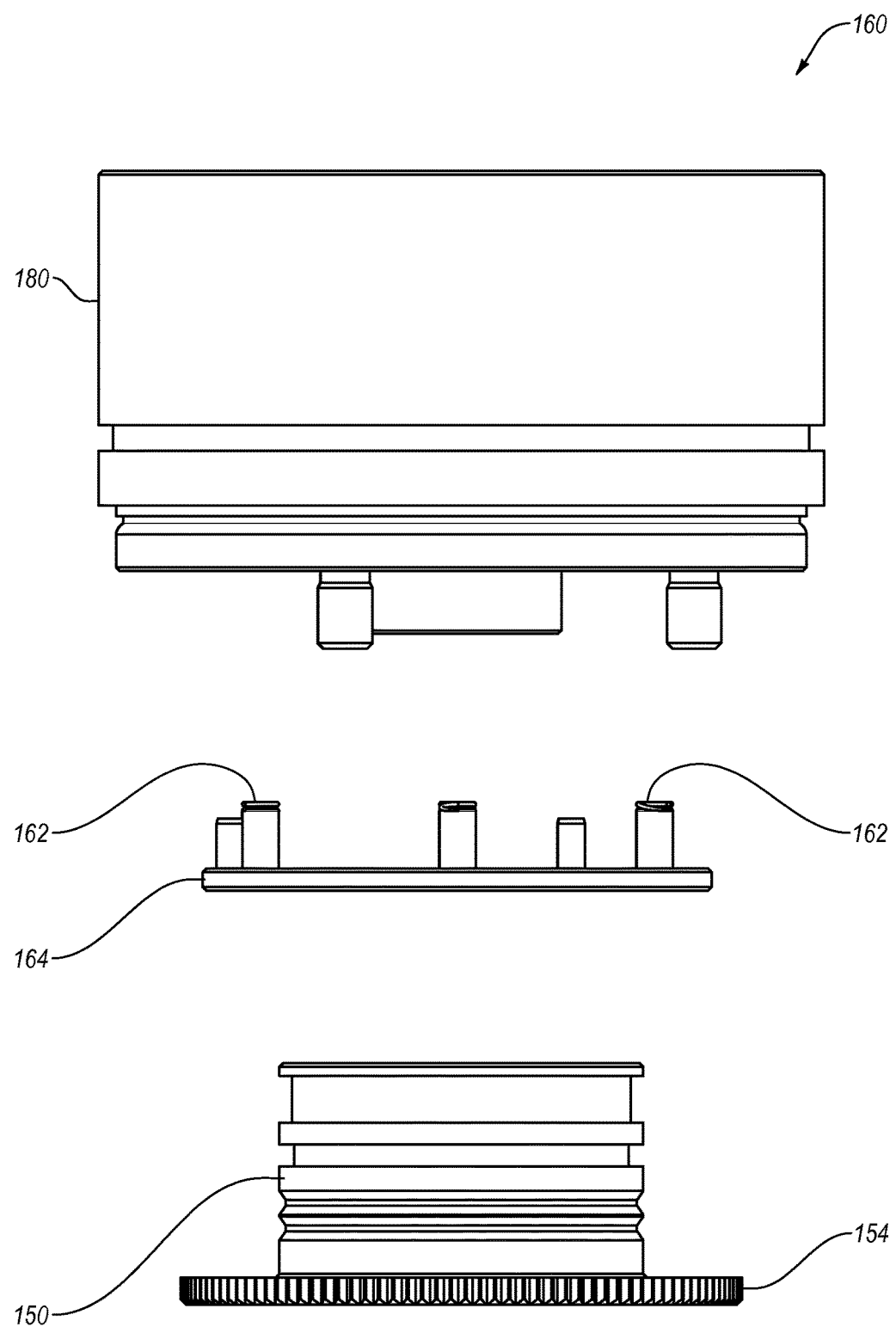
FIG. 8 is an exploded side view of one embodiment of a locking mechanism according to the present disclosure.

FIG. 8 is an exploded side view of locking mechanism 160 of turret 100. Locking mechanism 160 includes nut assembly 150 (which includes external locking ring 154 with outward-facing splines), saddle 180 (for example, which includes internal locking ring 182 with inward-facing splines shown in FIGS. 4A, 4B, 9A and 9B), one or more springs 162, and a ring 164 according to some embodiments. Springs 162 contact a top surface of ring 164. Springs 162 may be coil springs or any other type of spring including but not limited to leaf springs. While rotational movement of dial assembly 110 and nut assembly 150 may be selectively fixed with each other, all or part of dial assembly 110 and all or part of nut assembly 150 may be configured to translate along the rotational axis of dial assembly 110 between a locked position and an unlocked position. Thus, nut assembly 150 may be configured to selectively rotate with dial assembly 110 and translate along the rotational axis between the locked position and the unlocked position with dial assembly 110. For example, a lower position of dial assembly 110 may cause the splines of external locking ring 154 to engage with the splines of internal locking ring 182 thereby preventing nut assembly 150 from rotating relative to saddle 180. A bottom surface of ring 164 may contact an upper surface of nut assembly 150 such that springs 162 and ring 164 bias nut assembly 150 and dial assembly 110 toward the locked position.

In some embodiments, nut assembly 150 may include a spring-loaded ball that may engage one or more detents in casing 112 such that when dial assembly 110 is in a locked and/or unlocked position, the spring-loaded ball engages a detent. The detents may be found on the interior surface of casing 112 so that dial assembly 110 may rotate relative to nut assembly 150 while the spring-loaded ball is engaged with a detent. The spring-loaded ball and detent can provide a tactile and/or an audible indication that locking mechanism 160 has moved from a locked position to an unlocked position or that locking mechanism 160 has moved from an unlocked position to a locked position.

Figure 9A:
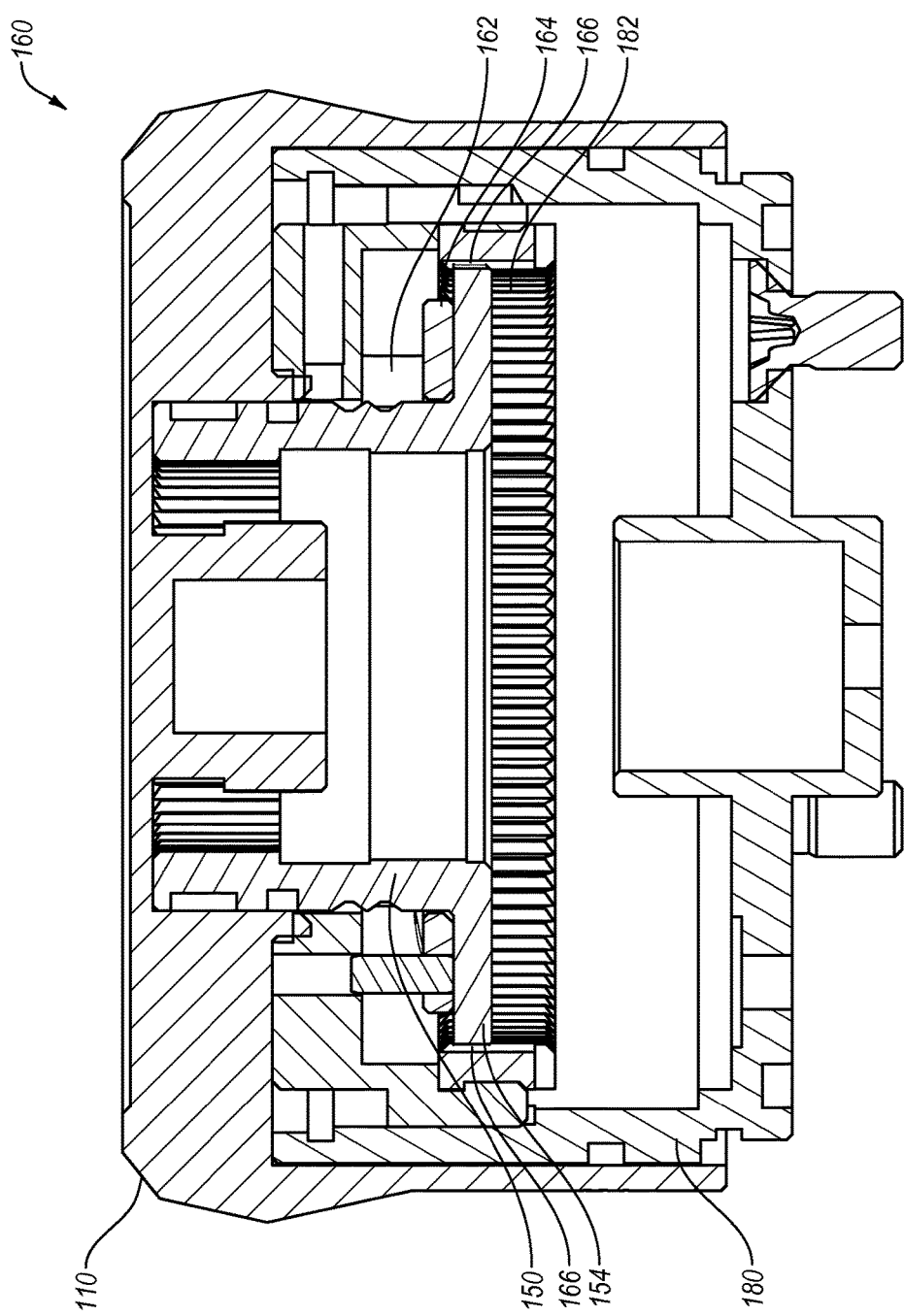
FIG. 9A is a side cutaway view of the locking mechanism shown in FIG. 8 in a first positional configuration.

FIG. 9A illustrates a side cutaway view of locking mechanism 160 in the locked position. In this position, the outward-facing splines of external locking ring 154 are engaged with the inward-facing splines of internal locking ring 182 at a junction 166 according to some embodiments. In this position, dial assembly 110 may be prevented from rotating in either direction relative to saddle 180.

Figure 9B:
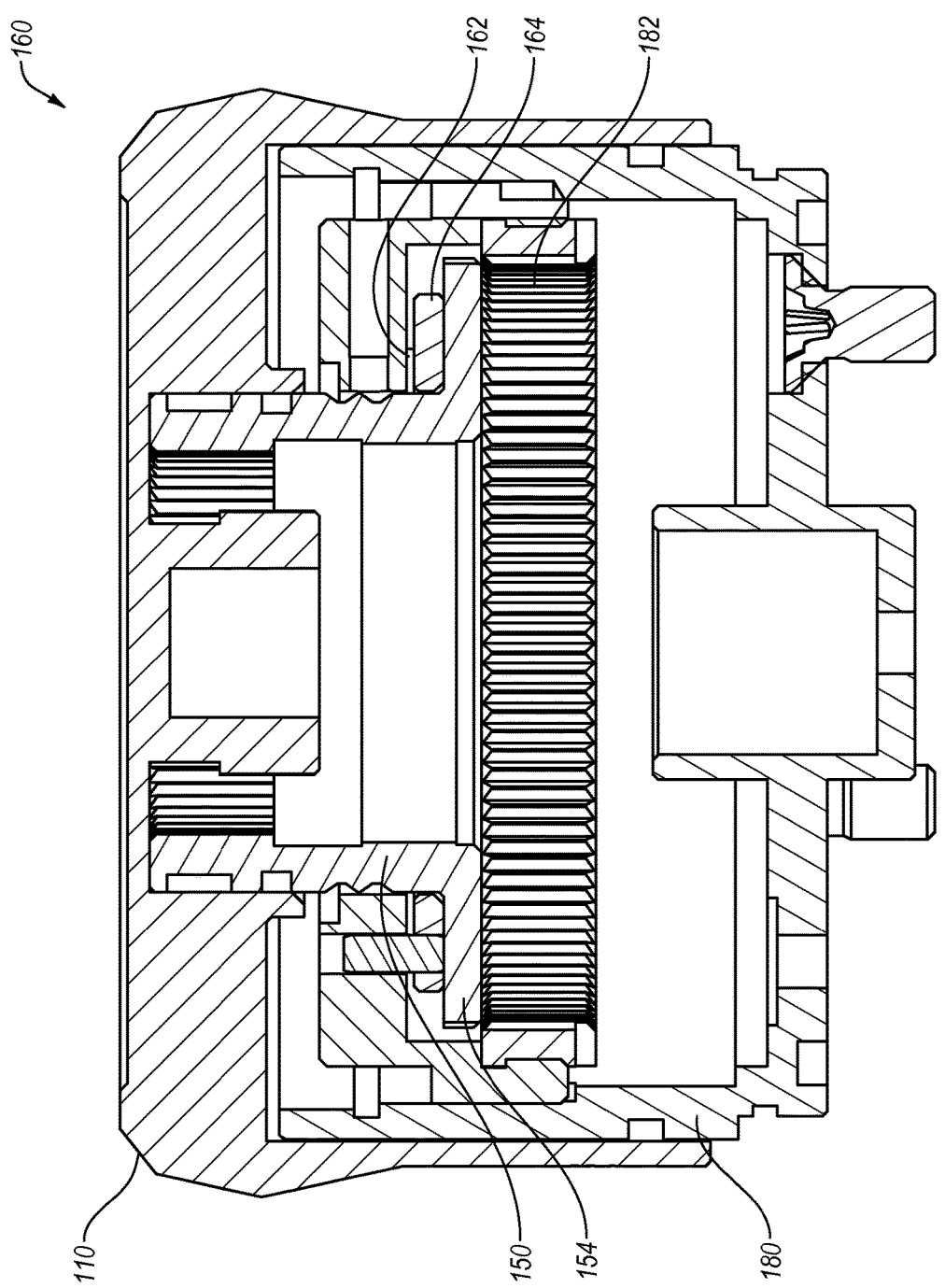
FIG. 9B is a side cutaway view of the locking mechanism shown in FIG. 8 in a second positional configuration.

FIG. 9B illustrates a side cutaway view of locking mechanism 160 in the unlocked position. In this position, the outward-facing splines of external locking ring 154 may be disengaged from the inward-facing splines of internal locking ring 182. In this position, dial assembly 110 can rotate relative to saddle 180. In this position, springs 162 are compressed bias dial assembly 110 and nut assembly 150 downward toward the locked position.

In alternative embodiments, the bias created by springs may be selectively engageable. For example, FIG. 10 is a perspective view of a turret 200 according to some embodiments. Turret 200 may include a locking mechanism and many or all of the same internal components as turret 100. The locking mechanism of turret 200 may include a lever 202 that is adjustable between a first position and a second position. Specifically, lever 202 can slide between the first position (for example, shown in FIG. 10) and the second position (for example, by moving in the direction indicated by arrow 204). While lever 202 is in the first position, one or more springs that are part of a locking mechanism within turret 200 may be engaged and bias the dial assembly toward the locked position. While the lever 202 is in the second position, the one or more springs that are part of the locking mechanism within turret 200 may not be engaged and do not bias the dial assembly toward the locked position.

The locking mechanisms may further include an electrical switch that is selectable between an opened state and a closed state. Movement of a dial assembly between a locked position and an unlocked position may cause the switch to alternate between the opened state and the closed state. The electrical switch may be configured to turn on an electronic feature of the scope while the dial assembly is in the unlocked position and turn off the electronic feature while the dial assembly is in the locked position. Electronic features that may be turned on or off include any electronic system including but not limited to an encoder, a processor, a motor, and any type of a light source (such as a display, reticle illumination, or laser).

Figure 11A:
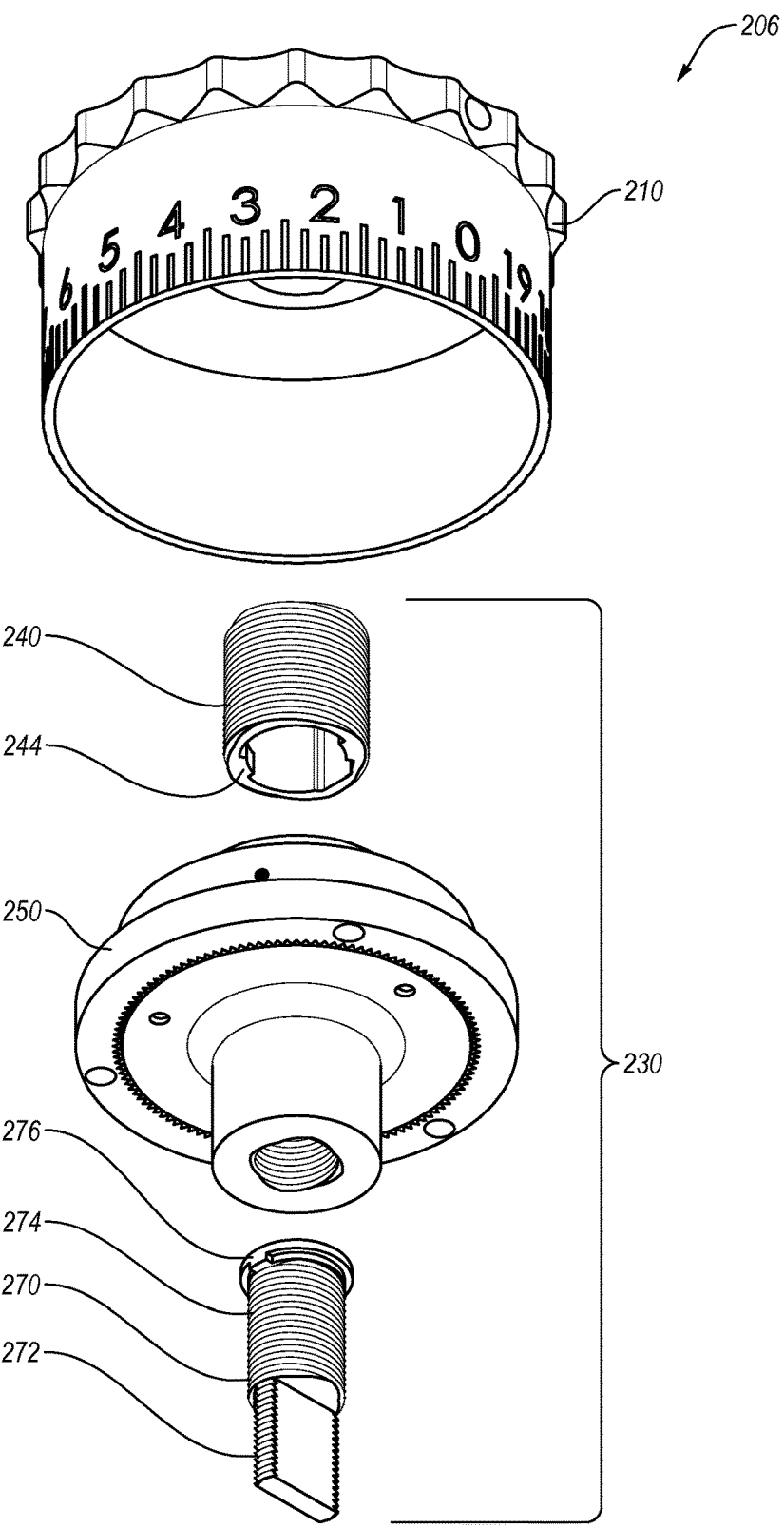
FIG. 11A is a cutaway and exploded perspective view of a dial assembly and internally-adjustable stop assembly of one embodiment of the present disclosure.

FIG. 11A is an exploded perspective view of a turret 206 having a dial assembly 210 and an adjustable stop assembly 230 according to some embodiments. Dial assembly 210 may include an engagement mechanism 220 (shown, for example, in FIG. 11B) and adjustable stop assembly 230 may include a traveler 240, a nut assembly 250, and a bolt 270. Dial assembly 210, traveler 240, and nut assembly 250 may be similar to dial assembly 110, traveler 140, and nut assembly 150 of turret 100. For example, traveler 240 may include an engagement tab 244, which may be similar to engagement tab 144 of turret 100. Bolt 270 may be similar to bolt 170 and may include a key portion 272 and a cylindrical shaft portion 274. Unlike stop tab 176 of bolt 170, bolt 270 may include a head cap 276 positioned at the top of cylindrical shaft portion 274. Head cap 276 may be a cylindrical disk with a diameter that is slightly larger than the diameter of cylindrical shaft portion 274.

Figure 11B:
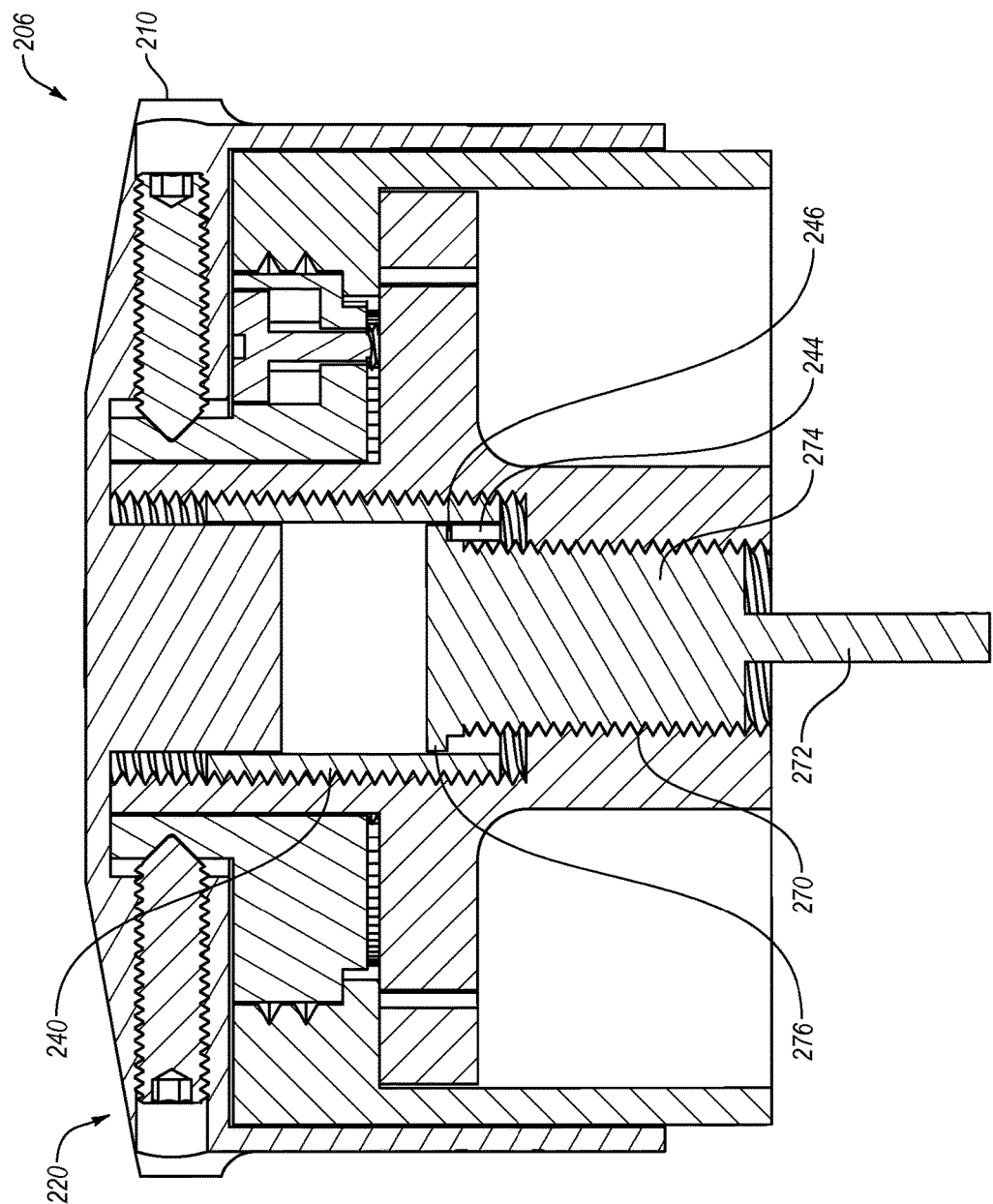
FIG. 11B is a side cutaway view of the dial assembly and internally-adjustable stop assembly shown in FIG. 11A.

FIG. 11B is a cutaway side view of turret 206 where traveler 240 and bolt 270 are in contact and create a hard-stop such that dial assembly 210 may be prevented from rotating in a direction that would either raise traveler 240 (while engagement mechanism 220 is in a disengaged position) or lower bolt 270 (while engagement mechanism 220 is in an engaged position) according to some embodiments. For example, a top surface of engagement tab 244 may contact a lower surface of head cap 276 at junction 246. Engagement mechanism 220 allows the components of stop assembly 230 to be adjusted by selectively engaging engagement mechanism 220 and rotating dial assembly 210. In this configuration, adjustable stop assembly 230 is internally-adjustable, as adjustments can be made to stop assembly 230 while components of stop assembly 230 are internal to dial assembly 210.

According to some embodiments, an adjustable stop assembly may be configured to be externally-adjustable. For example, in some embodiments a dial assembly may be removed from a turret, exposing some or all of the components of the adjustable stop assembly. While the dial assembly is removed, adjustment may be made directly to the stop assembly by hand or with a tool. In such a configuration, the adjustable stop assembly would be externally adjustable, as adjustments can be made to the stop assembly while components of the stop assembly are external to the dial assembly.

Figure 12:
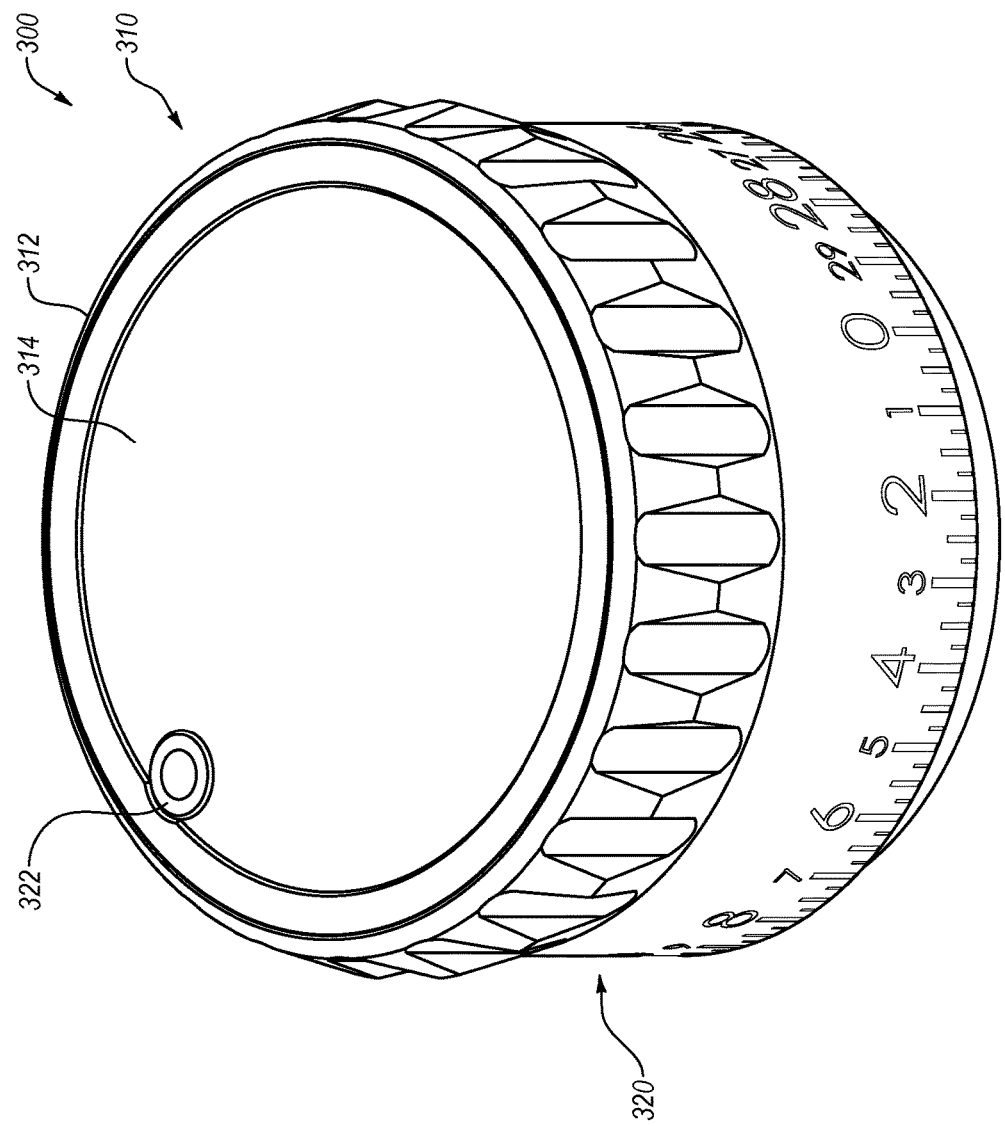
FIG. 12 is a perspective view of yet another embodiment of the turret of the present disclosure.

FIG. 12 is a perspective view of a turret 300 having a dial assembly 310 and an internally adjustable stop assembly according to some embodiments. The internally adjustable stop assembly may include the same or similar components as internally adjustable stop assembly 130, described above. For example, the internally adjustable stop assembly may include nut assembly 350 (for example, shown in FIG. 15) and may also include a traveler and a bolt.

Dial assembly 310 may include a casing 312, a cap dial 314, and an engagement mechanism 320 that may be configured to selectively couple dial assembly 310 to nut assembly 350 (for example, shown in FIG. 15) such that nut assembly 350 may rotate with dial assembly 310 while engagement mechanism 320 is in an engaged position. Further, nut assembly 350 may not be configured to rotate with dial assembly 310 while engagement mechanism 320 is in a disengaged position.

Engagement mechanism 320 may include a button 322 that is configured to slide between the engaged position and the disengaged position. Button 322 may be positioned anywhere on turret 300. For example, button 322 may be positioned on a top surface of dial assembly 310. In other embodiments, button 322 may be positioned on a lateral surface of dial assembly 310 or elsewhere on turret 300. Cap dial 314 may rotate relative to the other components of dial assembly 310 while button 322 slides between the engaged and disengaged positions. In one embodiment, button 322 may only be configured to slide between the engaged position and the disengaged position while in a depressed state relative to the dial assembly. In this embodiment, button 322 may be prevented from sliding between the engaged position and the disengaged position while not in the depressed state. The head of button 322 may be shaped to receive the pointed end of an object, such as the tip of a bullet or a sharp object such as a knife. By pressing a bullet tip or another pointed object into the head of button 322, button 322 may be forced into a depressed state relative to the dial assembly thus enabling button 322 to slide from the engaged position to the disengaged position, or from the disengaged position to the engaged position.

FIG. 13A is a top view of turret 300 with cap dial 314 removed. Button 322 is configured to slide within slot 324 between the engaged position and the disengaged position according to some embodiments. FIG. 13B is a bottom view of dial assembly 310 and engagement mechanism 320. Button 322 is in the engaged position in FIGS. 13A and 13B. As can be seen in FIG. 13B, engagement mechanism 320 may include one or more cam slots 326 and one or more teeth assemblies 327. Teeth assemblies 327 may include one or more teeth segments 328 and one or more cam followers 329 that extend within cam slots 326. Cam follower 329 may be configured to move within cam slots 326 as button 322 moves within slot 324 between positions in which engagement mechanism 320 is engaged and disengaged. As cam followers 329 move within cam slots 326, teeth segments 328 move between an engaged position (for example, shown in FIG. 13B) and a nonengaged position.

Figure 14B:
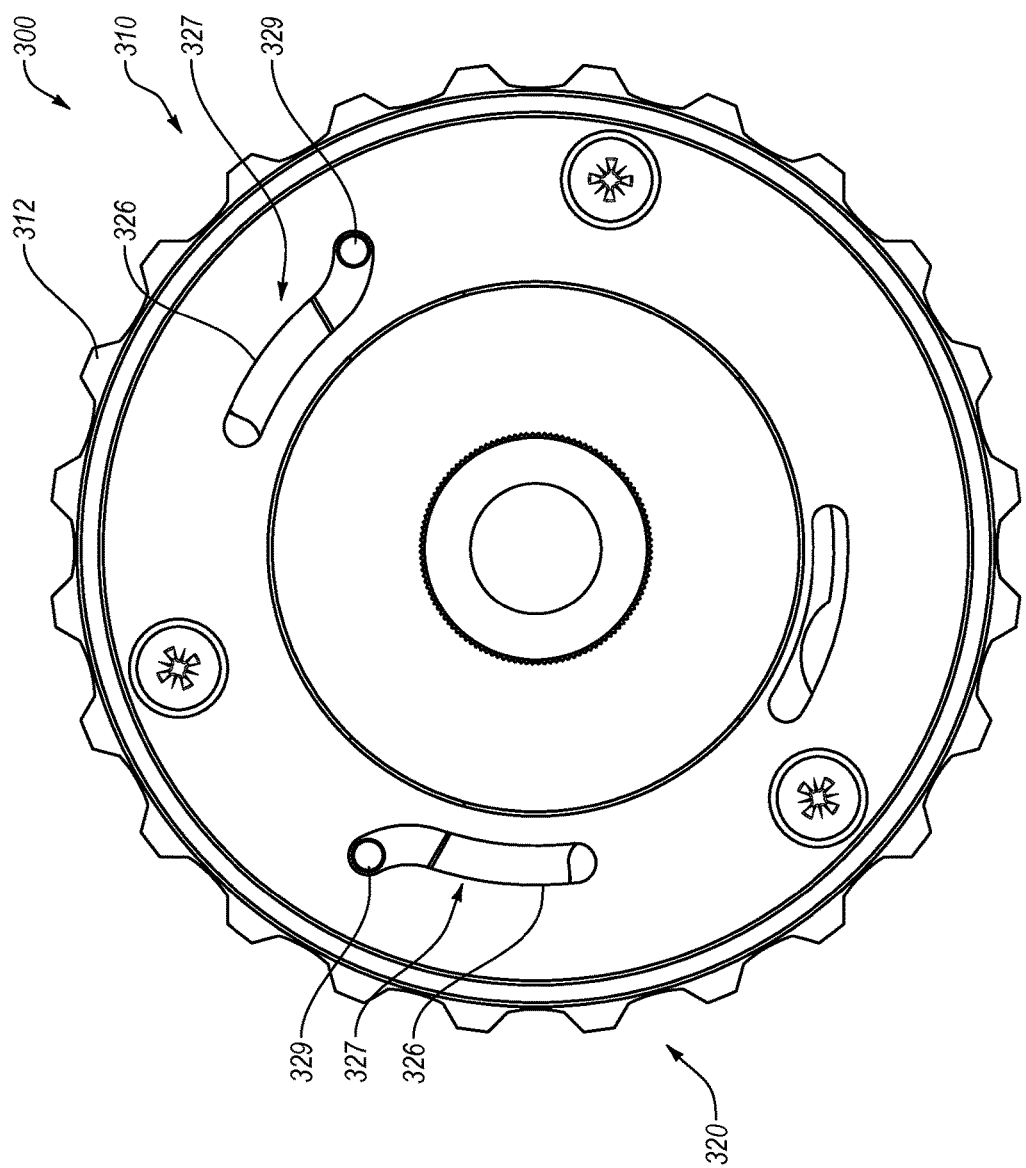
FIG. 14B is a bottom view of the turret shown in FIG. 12 in a second positional configuration.

FIG. 14A is also a top view of turret 300 with cap dial 314 removed. FIG. 14B is a bottom view of dial assembly 310 and engagement mechanism 320 according to some embodiments. Unlike FIGS. 13A and 13B, in this example, button 322 is in the disengaged position in FIGS. 14A and 14B. Specifically, as can be seen in FIG. 14B, teeth segments 328 are in a nonengaged position.

Figure 15:
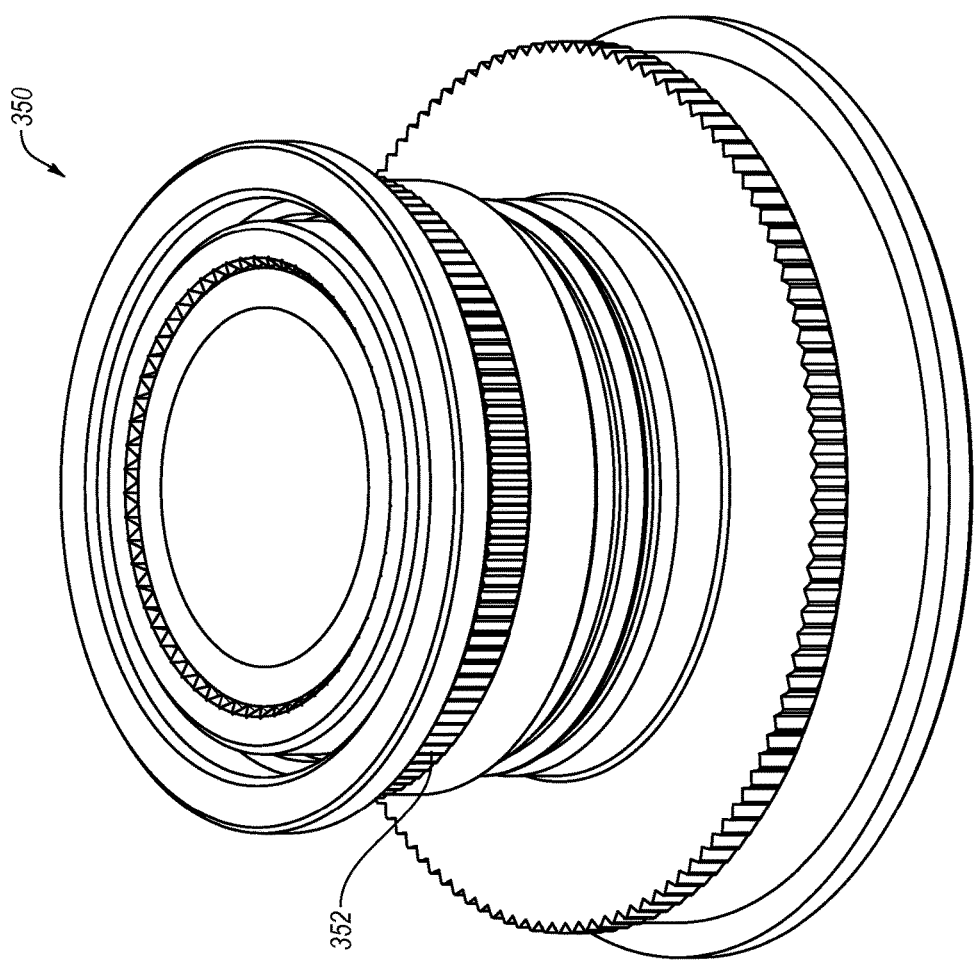
FIG. 15 is a perspective view of the nut assembly of the turret shown in FIG. 12.

FIG. 15 is a perspective view of nut assembly 350 of engagement mechanism 320. Nut assembly 350 may include a spline ring 352 according to some embodiments. Spline ring 352 may be fixed with nut assembly 350 such that it does not rotate independently of nut assembly 350.

Figure 16:
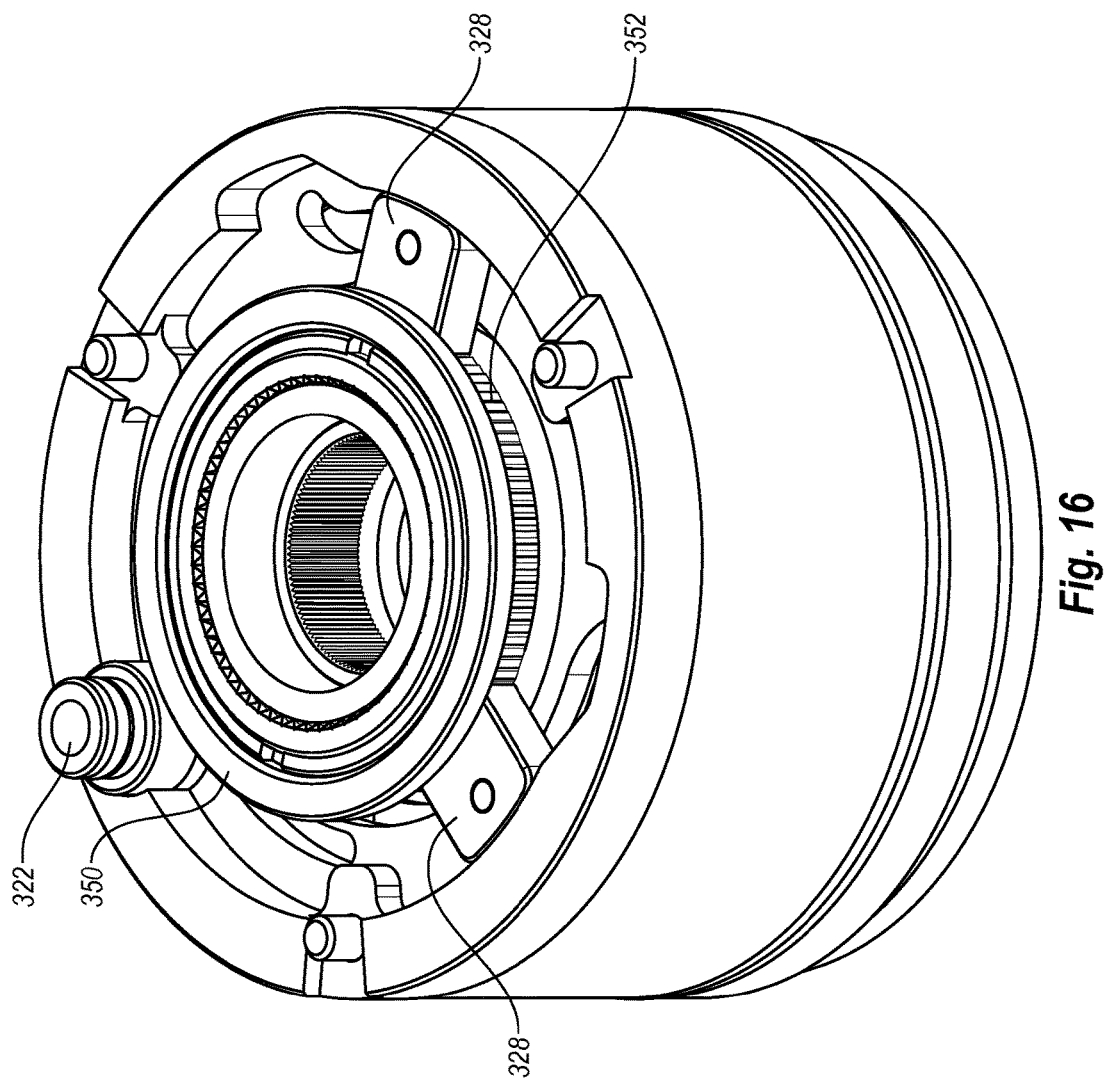
FIG. 16 is a perspective view of the engagement mechanism of the turret shown in FIG. 12.

FIG. 16 is a perspective view of turret 300 with casing 312 and cap dial 314 removed according to some embodiments. In FIG. 16, engagement mechanism 320 is in the engaged position. In the engaged position, button 322 is positioned such that teeth segments 328 engage spline ring 352 and couple dial assembly 310 to nut assembly 350. In this configuration, nut assembly 350 rotates with dial assembly 310. In some embodiments, engagement mechanism 320 may be placed in the disengaged position by sliding button 322 to the disengaged position, which will cause teeth segments 328 to disengage from spline ring 352. When teeth segments 328 are disengaged from spline ring 352, nut assembly 350 will not rotate with dial assembly 310.

The internally-adjustable stop assembly may function in the manner described above with respect to internally-adjustable stop assembly 130 of turret 100. For example, while engagement mechanism 320 is in the disengaged position, a traveler within turret 300 may translate relative to dial assembly 310 as dial assembly 310 rotates. While engagement mechanism 320 is in the engaged position, a bolt within turret 300 may translate relative to dial assembly 310 as dial assembly 310 rotates. In some embodiments, dial assembly 310 may not translate relative to a scope on which turret 300 is mounted as dial assembly 310 rotates. Thus, in some embodiments, dial assembly 310 is vertically non-raising when rotated.

In some embodiments, engagement mechanisms may further include an electrical switch that is selectable between an opened state and a closed state. Movement of a portion of an engagement mechanism (such as, for example, set screws 124 or button 322) between an engaged position and a disengaged position may cause the switch to alternate between the opened state and the closed state. The electrical switch may be configured to turn on (or off) an electronic feature of the scope while the engagement mechanism is in the engaged position and turn off (or on) the electronic feature while the engagement mechanism is in the disengaged position. Electronic features that may be turned on or off include any electronic system including but not limited to an encoder, a processor, a motor, and any type of a light source (such as a display, reticle illumination, or laser).

Figure 17A:
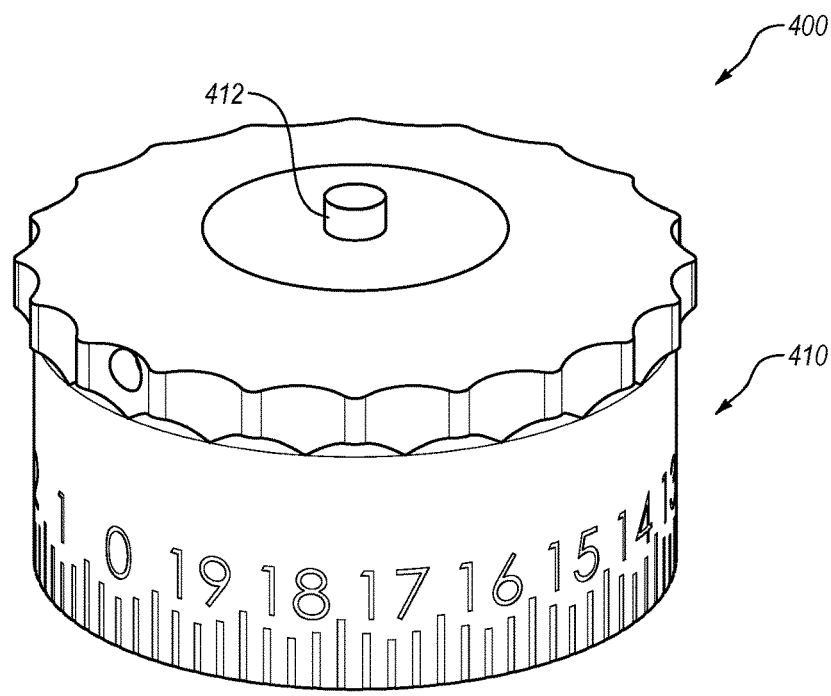
FIG. 17A is a perspective view of another embodiment of the turret of the present disclosure in a first positional configuration.
Figure 17B:
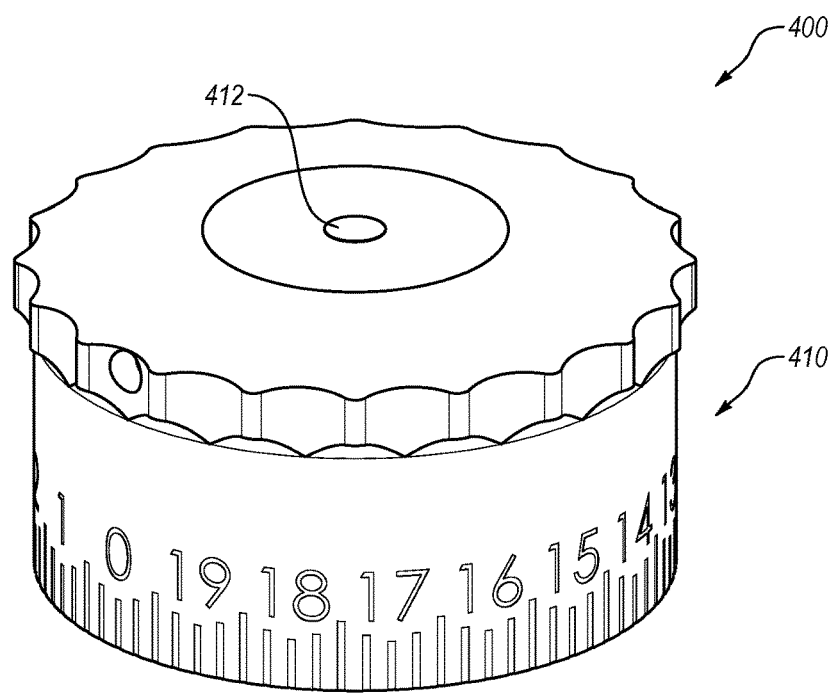
FIG. 17B is a perspective view of the turret shown in FIG. 17A in a second positional configuration.

FIG. 17A is a perspective view of turret 400 having a dial assembly 410 according to some embodiments. Turret 400 may include an internally adjustable stop assembly that is similar or the same as internally adjustable stop assembly 130, described above. Dial assembly 410 may include an indicator 412 at the top of dial assembly 410 that can provide a user with a visual and/or tactile indication of how many revolutions the dial assembly has completed. For example, indicator 412 may indicate whether the dial assembly is in a first revolution or a second revolution. Indicator 412 may extend upward through the middle and/or top of dial assembly 410 or any other location that may, for example, be conspicuous to the user, and/or that may provide some indication that the dial has been rotated through at least the second revolution. FIG. 17A shows indicator 412 in an up position that is not flush with top of dial assembly 410. FIG. 17B shows indicator 412 in a down position that is flush with top of dial assembly 410. Indicator 412 may be located anywhere on external surface of turret 400. For example, in some embodiments, an indicator may be located on a lateral surface of a dial assembly.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

The invention claimed is:

1. A scope turret configured to adjust a point of aim optics inside a scope, the scope having a longitudinal axis, the scope turret comprising:
   a dial assembly configured to rotate about a rotational axis that is perpendicular to the longitudinal axis of the scope; and
   an adjustable stop assembly configured to prevent the dial assembly from rotating in one direction, the adjustable stop assembly comprising a nut assembly selectively coupled to the dial assembly through an engagement mechanism, wherein:
      the nut assembly is configured to rotate with the dial assembly while the engagement mechanism is in an engaged position,
      the nut assembly defines an internal open space and a first set of inside diameter threads with a first diameter and a second set of inside diameter threads having a second diameter that is different from the first diameter;
   a traveler positioned at least partially within the internal open space defined by the nut assembly, wherein:
      the traveler includes a first set of outside diameter threads configured to engage the first set of inside diameter threads of the nut assembly; and
      a first set of vertical striations on an internal radial surface of the traveler, the first set of vertical striations configured to slidably engage a second set of vertical striations formed in a portion of the dial assembly.

2. The scope turret of claim 1, wherein the adjustable stop assembly is externally-adjustable.

3. The scope turret of claim 1, wherein the adjustable stop assembly is internally-adjustable.

4. The scope turret of claim 3,
   the nut assembly is not configured to rotate with the dial assembly while the engagement mechanism is in a disengaged position.

5. The scope turret of claim 4, wherein:
   the adjustable stop assembly further includes a traveler that defines an internal open space;
   the traveler is rotationally coupled to the dial assembly and translatably coupled to the nut assembly such that the traveler is configured to rotate with the dial assembly and the nut assembly while the engagement mechanism is in the engaged position and the traveler is configured to rotate with the dial assembly and translate relative to the nut assembly while the engagement mechanism is in the disengaged position.

6. The scope turret of claim 5, wherein:

the adjustable stop assembly further includes a bolt positioned at least partially within the internal open space defined by the traveler;

the bolt includes a second set of outside diameter threads configured to engage the second set of inside diameter threads of the nut assembly; and the bolt is translatably coupled to the nut assembly such that the bolt translates without rotation relative to the nut assembly while the engagement mechanism is in the engaged position.

7. The scope turret of claim 6, wherein: the traveler includes an engagement tab;

the bolt includes a stop tab, and the dial assembly is prevented from rotation in one direction while the engagement tab and stop tab are in contact.

8. The scope turret of claim 4, wherein the engagement mechanism comprises at least one set screw configured to selectively couple the dial assembly with the nut assembly.

9. The scope turret of claim 4, wherein the nut assembly includes a spline ring, and the engagement mechanism includes one or more toothed segments that are configured to engage the spline ring while the engagement mechanism is in the engaged position.

10. The scope turret of claim 1, wherein the dial assembly is not configured to translate relative to the scope during rotation of the dial assembly.

* * * * *